(12) United States Patent
Zhang et al.

(10) Patent No.: US 11,412,513 B2
(45) Date of Patent: Aug. 9, 2022

(54) NUMEROLOGY SCHEMES AND SYSTEM BASIC TIMING FOR FUTURE NETWORKS

(71) Applicants: Liqing Zhang, Ottawa (CA); Jianglei Ma, Ottawa (CA); Yongxia Lyu, Shenzhen (CN); Peiying Zhu, Ottawa (CA)

(72) Inventors: Liqing Zhang, Ottawa (CA); Jianglei Ma, Ottawa (CA); Yongxia Lyu, Shenzhen (CN); Peiying Zhu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 16/952,315

(22) Filed: Nov. 19, 2020

(65) Prior Publication Data

US 2021/0307009 A1    Sep. 30, 2021

Related U.S. Application Data

(60) Provisional application No. 63/000,235, filed on Mar. 26, 2020.

(51) Int. Cl.
*H04W 72/04* (2009.01)
*H04L 5/00* (2006.01)
*H04L 27/26* (2006.01)

(52) U.S. Cl.
CPC ....... *H04W 72/0453* (2013.01); *H04L 5/0007* (2013.01); *H04L 5/0092* (2013.01);
(Continued)

(58) Field of Classification Search
CPC ............ H04W 72/0453; H04W 72/042; H04L 27/26025; H04L 27/2607; H04L 5/001; H04L 5/0026; H04L 5/0064; H04L 5/0092
See application file for complete search history.

(56) References Cited

U.S. PATENT DOCUMENTS

| 10,476,651 | B2* | 11/2019 | Zhang | H04L 27/26025 |
| 2006/0045126 | A1 | 3/2006 | Klahn et al. | |
| 2016/0352551 | A1* | 12/2016 | Zhang | H04L 27/26025 |
| 2018/0139773 | A1* | 5/2018 | Ma | H04L 5/0053 |
| 2018/0234227 | A1* | 8/2018 | Zhang | H04W 72/042 |

(Continued)

FOREIGN PATENT DOCUMENTS

| CN | 109075951 A | 12/2018 |
| CN | 109995486 A | 7/2019 |

(Continued)

OTHER PUBLICATIONS

3rd Generation Partnership Project; Technical Specification Group Radio Access Network; Evolved Universal Terrestrial Radio Access (E-UTRA); Physical channels and modulation (Release 16), 3GPP TS 36.211, V16.3.0, Sep. 2020, 249 pages.

(Continued)

*Primary Examiner* — Mounir Moutaouakil

(57) ABSTRACT

By defining more SCS options and Discrete Fourier Transform ("DFT") options for transmissions in future networks, there arises cause to select from among the options, with aspects of the channel as guidance for the selection. In addition, new CP designs may be defined for use with the new SCS options and the new DFT options along with methods of selecting a CP design appropriate to a particular situation. The new CP designs may be shown to have smaller CP overhead when compared to the known CP designs used for known combinations of an SCS option with an FFT size option. New sampling frequency design options and new system basic timing options may also be defined, along with methods of making appropriate selections from among these options. Control signaling using higher layers may be used to distribute configuration options that include multiple SCS options, CP duration options, sampling frequency options and DFT size options per sub-band. Later, layer 1 signaling may be used to specify a particular option from among the multiple options.

19 Claims, 19 Drawing Sheets

| CHANNEL BW (MHz) | SCS OPTION (kHz)/DFT SIZE OPTION (PAIRS) |
|---|---|
| 5 | 51.2/150, 25.6/300, 12.8/600, 40/192, 20/384 |
| 10 | 102.4/150, 51.2/300, 25.6/600, 12.8/1200, 80/192, 40/384, 20/768 |
| 15 | 102.4/150, 51.2/300, 25.6/600, 12.8/1200, 80/192, 40/384, 20/768, 10/1536 |
| 20 | 204.8/150, 102.4/300, 51.2/600, 25.6/1200, 12.8/2400, 160/192, 80/384, 40/768, 20/1536, 10/3072 |
| 30 | 204.8/150, 102.4/300, 51.2/600, 25.6/1200, 12.8/2400, 160/192, 80/384, 40/768, 20/1536, 10/3072 |
| 40 | 204.8/300, 102.4/600, 51.2/1200, 25.6/2400, 12.8/4800, 160/384, 80/768, 40/1536, 20/3072 |
| 50 | 204.8/300, 102.4/600, 51.2/1200, 25.6/2400, 12.8/4800, 160/384, 80/768, 40/1536, 20/3072 |
| 100 | 204.8/600, 102.4/1200, 51.2/2400, 25.6/4800, 12.8/9600, 160/768, 80/1536, 40/3072 |
| 200 | 204.8/1200, 102.4/2400, 51.2/4800, 25.6/9600, 160/1536, 80/3072 |
| 400 | 204.8/2400, 102.4/4800, 51.2/9600, 160/3072 |

(52) U.S. Cl.
CPC ........ *H04L 5/0094* (2013.01); *H04L 27/2607* (2013.01); *H04W 72/042* (2013.01); *H04L 27/26025* (2021.01)

(56) References Cited

U.S. PATENT DOCUMENTS

| | | | | |
|---|---|---|---|---|
| 2018/0287750 | A1* | 10/2018 | Abdoli | .................. H04L 5/0094 |
| 2019/0190681 | A1* | 6/2019 | Li | .......................... H04W 76/34 |
| 2020/0076564 | A1* | 3/2020 | Zhang | ................. H04L 27/2602 |
| 2020/0229125 | A1* | 7/2020 | Manolakos | ........... G01S 5/0009 |

FOREIGN PATENT DOCUMENTS

| | | | | |
|---|---|---|---|---|
| EP | 3139558 | B1 | 8/2019 | |
| VN | 10028807 | B * | 7/2021 | ......... H04L 27/2602 |
| WO | WO-2018060816 | A1 * | 4/2018 | ........... H04L 5/0007 |
| WO | 2019084032 | A1 | 5/2019 | |
| WO | WO-2020096516 | A1 * | 5/2020 | ........... G01S 1/0428 |

OTHER PUBLICATIONS

3rd Generation Partnership Project; Technical Specification Group Radio Access Network; NR; Physical channels and modulation, (Release 16), 3GPP TS 38.211, V16.3.0, Sep. 2020, 133 pages.
3rd Generation Partnership Project; Technical Specification Group Radio Access Network; NR; Physical layer procedures for control; (Release 16), 3GPP TS 38.213, V16.3.0, Sep. 2020, 179 pages.
3rd Generation Partnership Project; Technical Specification Group Radio Access Network; NR; Radio Resource Control (RRC) protocol specification (Release 16), 3GPP TS 38.331 V16.2.0, Sep. 2020, 921 pages.

* cited by examiner

| NR NUMEROLOGY | FR1 (410 MHz – 7125 MHz) | | | FR2 (24250 MHz – 52600 MHz) | | |
|---|---|---|---|---|---|---|
| SCS (kHz) | 15 | 30 | 60 | 60 | 120 | 240 |
| CP TYPE(S) | NCP | NCP | NCP/ECP | NCP/ECP | NCP | NCP |
| MAX BW (MHz) | 50 | 100 | 100 | 200 | 400 | 400 |

FIG. 4 (PRIOR ART)

| n | $2^n * 128$ | m | $2^m * 150$ | l | $2^l * 192$ |
|---|---|---|---|---|---|
| 0 | 128 | 0 | 150 | 0 | 192 |
| 1 | 256 | 1 | 300 | 1 | 384 |
| 2 | 512 | 2 | 600 | 2 | 768 |
| 3 | 1024 | 3 | 1200 | 3 | 1536 |
| 4 | 2048 | 4 | 2400 | 4 | 3072 |
| 5 | 4096 | 5 | 4800 | 5 | 6144 |
| 6 | 8192 | 6 | 9600 | 6 | 12288 |

FIG. 5

| k | $2^k * 15$ kHz | $2^k * 12.8$ kHz | $2^k * 20$ kHz |
|---|---|---|---|
| 0 | 15 | 12.8 | 20 |
| 1 | 30 | 25.6 | 40 |
| 2 | 60 | 51.2 | 80 |
| 3 | 120 | 102.4 | 160 |
| 4 | 240 | 204.8 | 320 |
| 5 | 480 | 409.6 | 640 |

702: $2^n * 240$ kHz

| n | $2^n * 240$ kHz |
|---|---|
| 0 | 240 |
| 1 | 480 |
| 2 | 960 |
| 3 | 1920 |
| 4 | 3840 |
| 5 | 7680 |
| 6 | 15360 |
| 7 | 30720 |

704: $2^m * 204.8$ kHz

| m | $2^m * 204.8$ kHz |
|---|---|
| 0 | 204.8 |
| 1 | 409.6 |
| 2 | 819.2 |
| 3 | 1638.4 |
| 4 | 3276.8 |
| 5 | 6553.6 |
| 6 | 13107.2 |
| 7 | 26214.4 |

706: $2^l * 320$ kHz

| l | $2^l * 320$ kHz |
|---|---|
| 0 | 320 |
| 1 | 640 |
| 2 | 1280 |
| 3 | 2560 |
| 4 | 5120 |
| 5 | 10240 |
| 6 | 20480 |
| 7 | 40960 |

| CHANNEL BW (MHz) | SCS OPTION (kHz)/DFT SIZE OPTION (PAIRS) |
|---|---|
| 5 | 51.2/150, 25.6/300, 12.8/600, 40/192, 20/384 |
| 10 | 102.4/150, 51.2/300, 25.6/600, 12.8/1200, 80/192, 40/384, 20/768 |
| 15 | 102.4/150, 51.2/300, 25.6/600, 12.8/1200, 80/192, 40/384, 20/768, 10/1536 |
| 20 | 204.8/150, 102.4/300, 51.2/600, 25.6/1200, 12.8/2400, 160/192, 80/384, 40/768, 20/1536, 10/3072 |
| 30 | 204.8/150, 102.4/300, 51.2/600, 25.6/1200, 12.8/2400, 160/192, 80/384, 40/768, 20/1536, 10/3072 |
| 40 | 204.8/300, 102.4/600, 51.2/1200, 25.6/2400, 12.8/4800, 160/384, 80/768, 40/1536, 20/3072 |
| 50 | 204.8/300, 102.4/600, 51.2/1200, 25.6/2400, 12.8/4800, 160/384, 80/768, 40/1536, 20/3072 |
| 100 | 204.8/600, 102.4/1200, 51.2/2400, 25.6/4800, 12.8/9600, 160/768, 80/1536, 40/3072 |
| 200 | 204.8/1200, 102.4/2400, 51.2/4800, 25.6/9600, 160/1536, 80/3072 |
| 400 | 204.8/2400, 102.4/4800, 51.2/9600, 160/3072 |

FIG. 8

| $T_{CP}$ (μs) | SCS (kHz) | $\frac{T_{CP}}{T_u}$ overhead |
|---|---|---|
| 10.4 | 6.4 | 6.70% |
| 5.2 | 12.8 | 6.70% |
| 2.6 | 25.6 | 6.70% |
| 1.3 | 51.2 | 6.70% |
| 0.652 | 102.4 | 6.70% |
| 0.326 | 204.8 | 6.70% |
| 0.163 | 409.6 | 6.70% |

FIG. 10

| μ | SCS (kHz) | CYCLIC PREFIX |
|---|---|---|
| 0 | 15 | NORMAL |
| 1 | 30 | NORMAL |
| 2 | 60 | NORMAL, EXTENDED |
| 3 | 120 | NORMAL |
| 4 | 240 | NORMAL |
| X1 | HIGHER SCS 1 VALUE | NORMAL, EXTENDED |
| X2 | HIGHER SCS 2 VALUE | NORMAL, EXTENDED |
| ... | ... | NORMAL, EXTENDED |

FIG. 12

| $T_{cp}$ (μs) | SCS (kHz) | $\frac{T_{cp}}{T_u}$ overhead |
|---|---|---|
| 20.3 | 3276.8 | 6.70% |
| 85.4 | | 28% |
| 10.2 | 6553.6 | 6.70% |
| 42.7 | | 28% |
| 5.1 | 13107.2 | 6.70% |
| 21.4 | | 28% |

FIG. 13

| NUMBER OF OFDM SYMBOLS | $T_{cp}$ ($\mu s$) | REFERENCE DURATION ($\mu s$) | SCS (kHz) |
|---|---|---|---|
| 1 | 1.8229 | 1.9531 | 7680 |
| 2 | 0.8464 | 1.9531 | |
| 3 | 0.5208 | 1.9531 | |
| 4 | 0.3581 | 1.9531 | |
| 5 | 0.2604 | 1.9531 | |
| 6 | 0.1953 | 1.9531 | |

FIG. 14

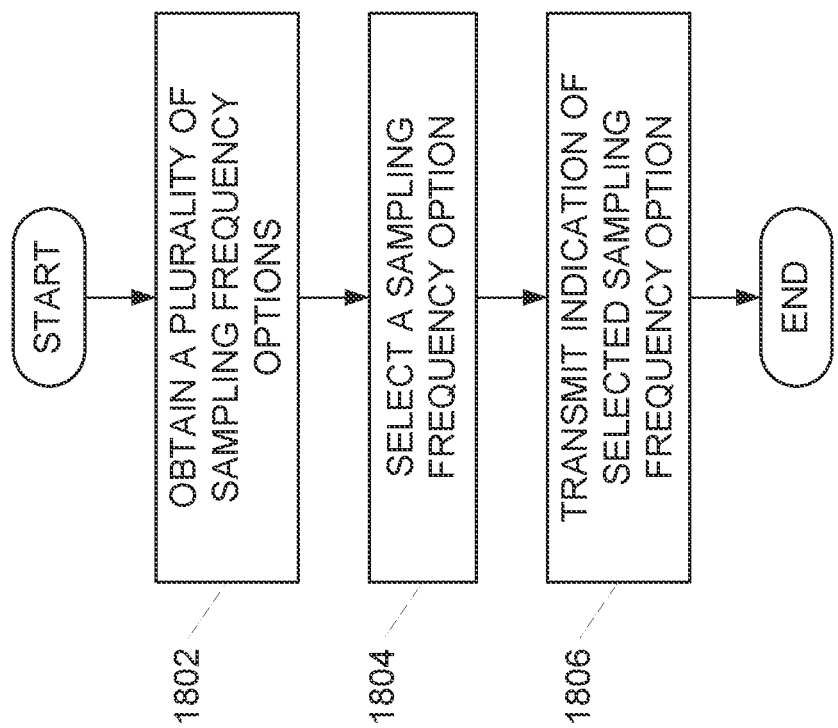

FIG. 19

| SUB-BAND BAND WIDTH 1902 | SUB-CARRIER SPACING OPTION 1904 | CP OPTIONS 1906 | DFT SIZE OPTIONS 1908 |
|---|---|---|---|
| X (<= B) | $M_{scs_0}$ FROM FIG. 6 (with $k = 0$) OR FROM FIG. 7 (with $n = 0$) | ONE OR MORE CP OPTIONS ASSOCIATED WITH $M_{scs_0}$ | ONE OR MORE DFT SIZE OPTIONS FROM FIG. 8 OR FIG 5 ASSOCIATED WITH $M_{scs_0}$ |
| X (<= B) | $M_{scs_1}$ FROM FIG. 6 (with $k = 1$) OR FROM FIG. 7 (with $n = 1$) | ONE OR MORE CP OPTIONS ASSOCIATED WITH $M_{scs_1}$ | ONE OR MORE DFT SIZE OPTIONS FROM FIG. 8 OR FIG 5 ASSOCIATED WITH $M_{scs_1}$ |
| X (<= B) | $M_{scs_{k/n}}$ FROM FIG. 6 (with $k = k$) OR FROM FIG. 7 (with $n = n$) | ONE OR MORE CP OPTIONS ASSOCIATED WITH $M_{scs_{k/n}}$ | ONE OR MORE DFT SIZE OPTIONS FROM FIG. 8 OR FIG 5 ASSOCIATED WITH $M_{scs_{k/n}}$ |

1900

NUMEROLOGY SCHEMES AND SYSTEM BASIC TIMING FOR FUTURE NETWORKS

CROSS-REFERENCE TO RELATED APPLICATION

The present application is related to U.S. Provisional Patent Application Ser. No. 63/000,235, entitled "Numerology Schemes And System Basic Timing For Future Networks," which was filed on Mar. 26, 2020, and which is incorporated herein by reference.

TECHNICAL FIELD

The present disclosure relates generally to configuring devices and, in particular embodiments, to configuring devices to use numerology schemes and system basic timing for future communication networks.

BACKGROUND

5G NR (New Radio) is a radio access technology (RAT) developed by the 3rd Generation Partnership Project (3GPP) for 5G (fifth generation) mobile telecommunications networks. 5G NR was designed to be the global standard for the air interface of 5G networks, which is a successor to 4G (fourth generation) networks and, earlier, Long Term Evolution (LTE) networks. The modulation scheme for 5G NR is orthogonal frequency division multiplexing (OFDM), which is a method of encoding digital data on multiple carrier frequencies and often uses Fast Fourier Transform (FFT) algorithms. FFT algorithms are special cases of Discrete Fourier Transform ("DFT") algorithms.

Various aspects of 5G NR are specified in a category called "numerology." Numerology for 5G NR includes options for subcarrier spacing (hereinafter "SCS options") and options for a cyclic prefix duration or a cyclic prefix (hereinafter "CP duration options" or "CP options"), which are associated with options for sizes for the DFT algorithms (hereinafter "DFT size options"). There exist known SCS options that include 15 kHz, 30 kHz, 60 kHz, 120 kHz and 240 kHz. There also exist known corresponding FFT size options, including 256, 512, 1024, 2048 and 4096. A base station is a network node among different networks, where the network node may perform communication control operations such as network configuration and scheduling for user equipment (UEs); the network node can be a conventional fixed base station (e.g., in an NR network or an LTE network), or can be mobile network node such as a satellite station, unmanned aerial vehicle (UAV), drone, integrated access and backhaul (IAB) node, etc.

For a given OFDM symbol, there are two parts: the CP part; and the useful OFDM symbol part. Often, efficiency of the given OFDM symbol may be expressed as an overhead percentage defined by a percentage of a CP duration (or time length) over the useful OFDM symbol duration for a given subcarrier spacing. For so-called "single CP" options (also called Category 1 type CP duration options), one CP time length is applied to multiple OFDM symbols using a particular SCS within a reference duration, such as a sub-frame/slot duration (e.g., 0.5 ms, 0.25 ms), where the reference duration can be, e.g., a transmission time unit (TTU) or one scheduling time unit, etc. Note that there could be multiple single CP duration options in terms of CP durations (associated with a SCS, thus multiple different CP overheads may be associated with one SCS). Usually, one CP duration option is applied to one or more symbols in a transmission time unit or one scheduling time unit; but a different CP duration option can be applied to one or more symbols in another transmission time unit or scheduling time unit. For so-called "two-CP" options (also called Category 2 type CP duration options), two CP durations are applied to multiple OFDM symbols using a particular SCS within a reference duration, such as sub-frame/slot duration (e.g., 0.5 ms, 0.25 ms), where the reference duration can be, e.g., a transmission time unit or one scheduling time unit, etc. Note that there could be multiple "two-CP" duration options in terms of two-type CP durations in each option (associated with a particular SCS, thus each option having two CP overheads regarding the particular SCS). Usually, one "two-CP" option is applied to one or more OFDM symbols in a transmission time unit or one scheduling time unit; but a different "two-CP" option can be applied to one or more symbols in another transmission time unit or scheduling time unit. In 5G NR, there is only one "two-CP" option called normal CP (NCP) and with fixed CP overheads, each overheard being around 7%; and there is only one single CP duration option, called extended CP (ECP) and with fixed CP overhead of 25%.

Some terminology notes: CP overhead in the present application may be defined in terms of a CP time length (or "CP duration") $T_{cp}$ over a useful OFDM symbol duration $T_u$, $T_{cp}/T_u$; there is another way of presenting CP overhead, defined by a CP time length over an OFDM symbol duration, $T_{cp}/T_{cp}+T_u$, which can be derived directly from the manner in which $T_{cp}$ and $T_u$ are configured. Moreover, these terms are interchangeable in the present application: reference duration; reference period; reference time interval; and reference time length. The terms "frame duration," "sub-frame duration" and "slot" may or may not have the same meanings from similar terms in NR or LTE. For example, the term "frame duration" in future networks may not have the value defined in 5G NR (10 ms) and can, instead, have a newly defined value. The relatively lower (carrier) frequency bands are referred to as FR1 and FR 2 frequency ranges and the relatively higher (carrier) frequency bands are optionally referred to as: the high end part of FR2; the high-end mmW bands (whose carrier frequency is larger than the maximum frequency in FR2); and the THz bands.

SUMMARY

By defining more SCS options and Discrete Fourier Transform ("DFT") size options for transmissions in future networks, there arises cause to select from among the options, with measured aspects of the channel used as guidance for the selection. In addition, new CP designs may be defined for use with the new SCS options and the new DFT size options, along with methods of selecting a CP design appropriate to a particular situation. The new CP designs may be shown to have more options with CP overheads when compared to the known CP designs used for LTE/NR SCS options and FFT size options. More CP duration options allow for flexible (or dynamic) CP usages during the transmissions based on channel or transmission conditions. New sampling frequency designs and new system basic timing may also be defined, along with methods of making appropriate selections therefrom. Control signaling using higher layers may be used to distribute configuration options that include multiple SCS options, CP duration options, sampling frequency options and DFT size options per sub-band. Later, layer 1 signaling may be used to specify a particular option from among the multiple options. It may be shown that the provision of the variety of numerology options provided in the present application has a lot more choices than existing standards and, accordingly, allows for finer granularity, more flexible numerology configuration and more spectrum efficient data transmissions.

According to an aspect of the present disclosure, there is provided a method performed by an apparatus. The method includes receiving a first configuration indicating a first subcarrier spacing (SCS) option from a first set of SCS options of at least one set of SCS options, wherein each SCS option among the first set of SCS options is an integer multiple of a first base SCS option from a plurality of base SCS options, wherein the at least one set of SCS options includes a second set of SCS options, wherein each SCS option among the second set of SCS options is an integer multiple of a second base SCS option from the plurality of base SCS options and communicating signals using the first SCS option in a carrier frequency band.

According to another aspect of the present disclosure, there is provided an apparatus. The apparatus includes at least one processor and a non-transitory computer readable storage medium storing programming for execution by the at least one processor. The programming including instructions to receive a first configuration indicating a first subcarrier spacing (SCS) option from a first set of SCS options of at least one set of SCS options, wherein each SCS option among the first set of SCS options is an integer multiple of a first base SCS option from a plurality of base SCS options, wherein the at least one set of SCS options includes a second set of SCS options, wherein each SCS option among the second set of SCS options is an integer multiple of a second base SCS option from the plurality of base SCS options; and communicate signals using the first SCS option in a carrier frequency band.

According to a further aspect of the present disclosure, there is provided a method performed by a network node. The method includes transmitting a first configuration indicating a first subcarrier spacing (SCS) option from a first set of SCS options of at least one set of SCS options, wherein each SCS option among the first set of SCS options is an integer multiple of a first base SCS option from among a plurality of base SCS options, the at least one set of SCS options including a second set of SCS options, wherein each SCS option among the second set of SCS options is an integer multiple of a second base SCS option from among the plurality of base SCS options and communicating signals using the first SCS option in a carrier frequency band.

According to still further aspect of the present disclosure, there is provided an apparatus. The apparatus at least one processor and a non-transitory computer readable storage medium storing programming for execution by the at least one processor. The programming includes instructions to transmit a first subcarrier spacing (SCS) from a first set of SCS options of at least one set of SCS options, wherein each SCS option among the first set of SCS options is an integer multiple of a first base SCS option from among a plurality of base SCS options, the at least one set of SCS options including a second set of SCS options, wherein each SCS option among the second set of SCS options is an integer multiple of a second base SCS option from among the plurality of base SCS options and communicating signals using the first SCS option in a carrier frequency band.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 4 illustrates a table that provides an overview of various options currently available for known communication networks;

FIG. 5 illustrates a table that provides, according to aspects of the present application, DFT transform size options for future communication networks;

FIG. 6 illustrates a table that provides, according to aspects of the present application, SCS options for future communication networks;

FIG. 7 illustrates a table that provides, according to aspects of the present application, further SCS options for future communication networks;

FIG. 8 illustrates a table that provides, according to aspects of the present application, sets of option pairs (SCS option associated with a DFT transform size option) that have been determined to be suitable for supporting specific base channel bandwidths;

FIG. 10 illustrates a table of examples of CP duration associated with SCS for a 6.7% overhead, according to aspects of the present application;

FIG. 12 illustrates a table including a first column for an SCS option index, a second column for SCS option and a third column for indicating whether only normal CP or both normal CP and extended CP are available for the corresponding selection of SCS option, according to aspects of the present application;

FIG. 13 illustrates a table of CP durations specified for three distinct SCS options in high frequency ranges and for two distinct overheads, according to aspects of the present application;

FIG. 14 illustrates a table of CP durations specified for a particular SCS option, a particular reference duration and a variety of numbers of OFDM symbols, according to aspects of the present application;

FIG. 18 illustrates example steps in a method selecting from among options for a communication session in a network, according to aspects of the present application; and FIG. 19 illustrates a table that provides associations between sub-band option, SCS option, CP duration options and DFT size options for future networks, according to aspects of the present application.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
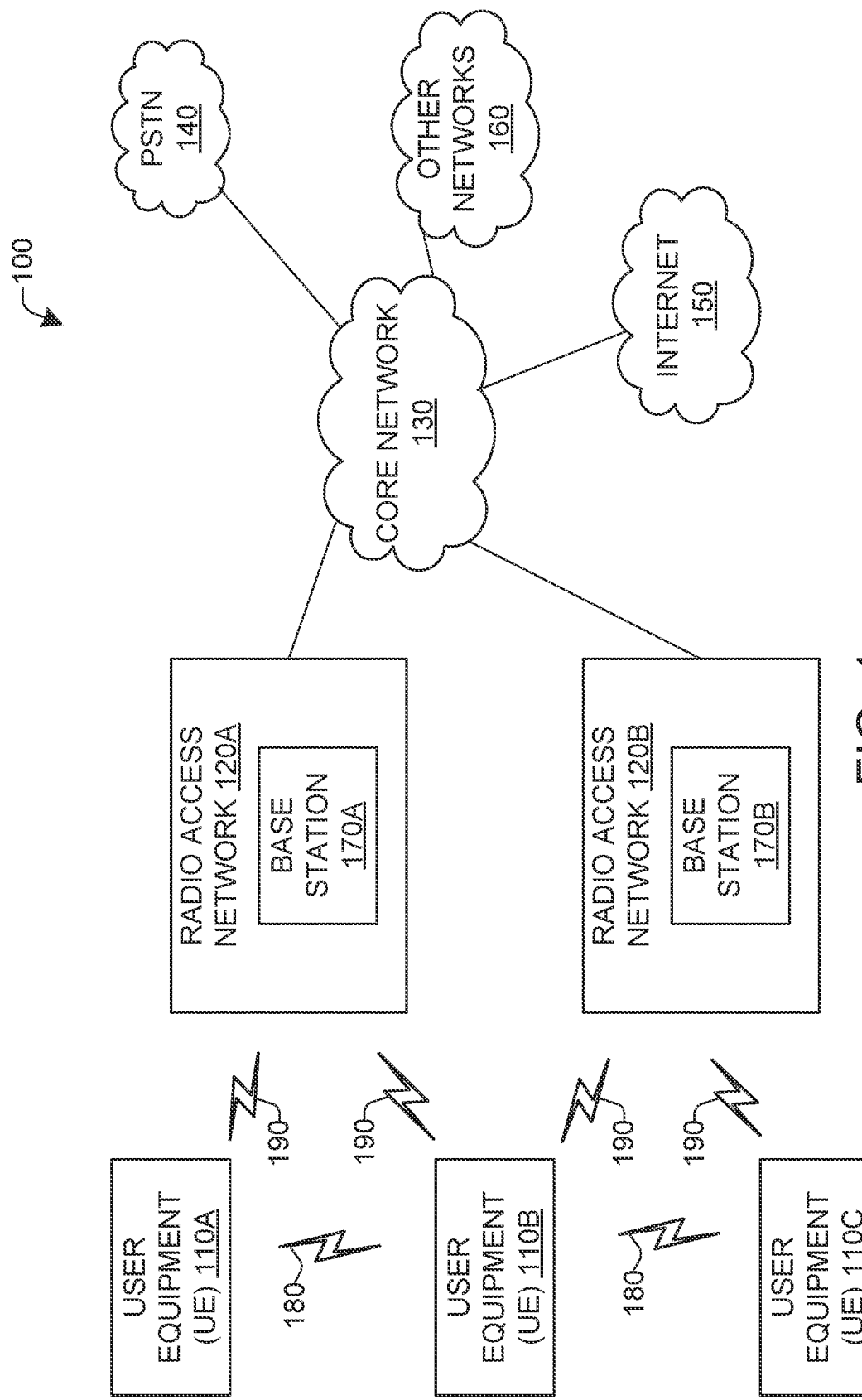
FIG. 1 illustrates, in a schematic diagram, a communication system in which embodiments of the disclosure may occur, the communication system includes example user equipment and an example base station.
Figure 2:
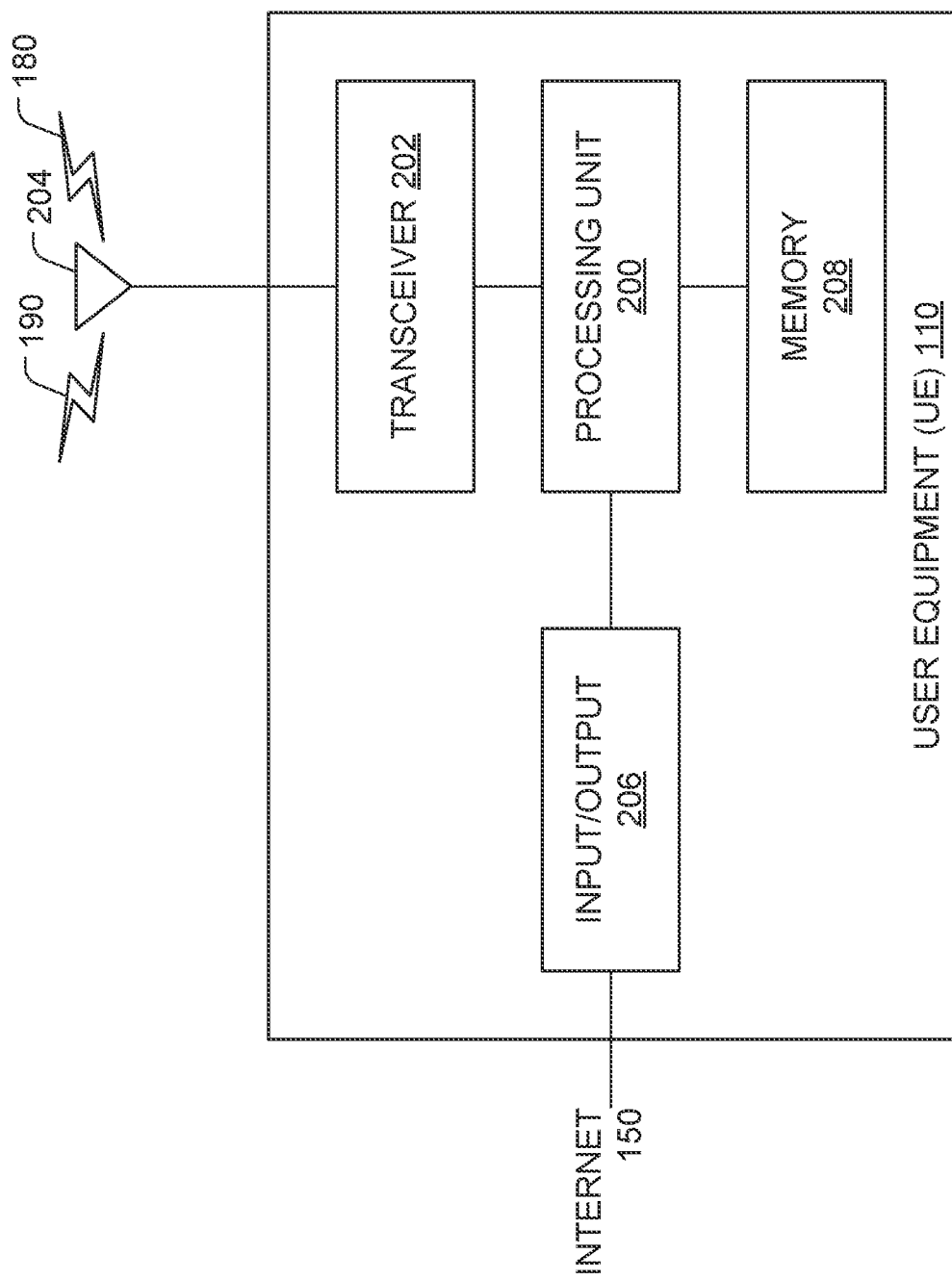
FIG. 2 illustrates, as a block diagram, an example user equipment of FIG. 1, according to aspects of the present disclosure.
Figure 3:
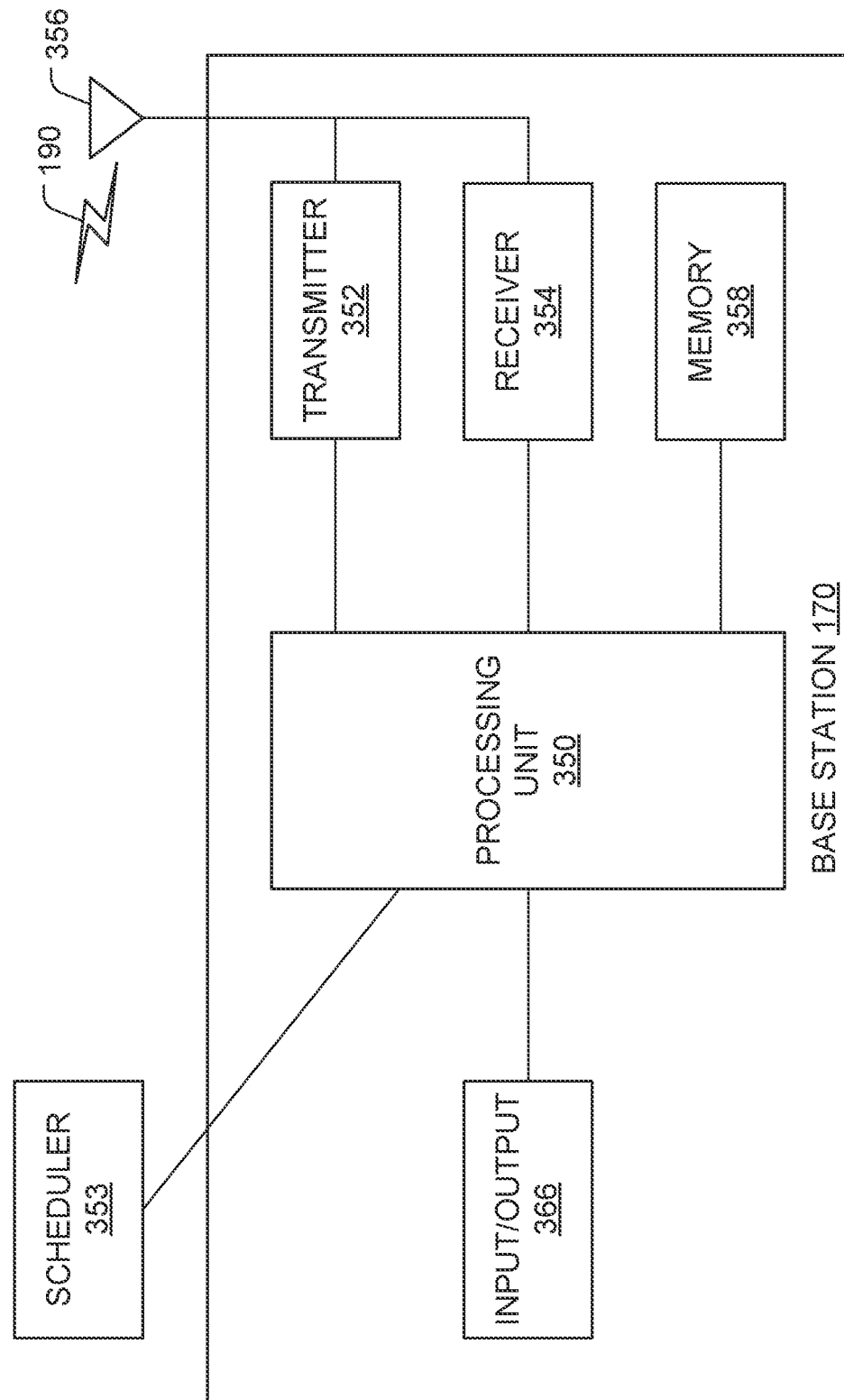
FIG. 3 illustrates, as a block diagram, the example base station of FIG. 1, according to aspects of the present disclosure.

FIGS. 1, 2 and 3 illustrate examples of networks and devices that could implement any or all aspects of the present disclosure.

FIG. 1 illustrates an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the first RAN 120A includes a first base station 170A and the second RAN includes a second base station 170B (individually or collectively 170). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any UE 110 may be alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some, or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High-Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA20001x, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the UEs 110 communication with one or more of the base stations 170 or they may be substantially different. For example, the communication system 100 may implement one or more channel access methods, such as CDMA, TDMA, FDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

FIG. 2 illustrates example components that may implement the methods and teachings according to the present disclosure. In particular, FIG. 2 illustrates an example UE 110. These components could be used in the communication system 100 or in any other suitable system.

As shown in FIG. 2, the UE 110 includes at least one processor or processing unit 200. The processing unit 200 implements various processing operations of the UE 110. For example, the processing unit 200 could perform signal coding, bit scrambling, data processing, power control, input/output processing, or any other functionality, thereby enabling the UE 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, a microcontroller, a digital signal processor, a field programmable gate array or an application specific integrated circuit.

The UE 110 also includes at least one transceiver 202. The transceiver 202 includes an RF circuit (not shown) that is configured to modulate data or other content for transmission by at least one antenna 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna among the at least one antenna 204 includes any suitable structure for transmitting and/or receiving wireless or wired signals. One or multiple transceivers 202 could be used in the UE 110. One or multiple antennas 204 could be used in the UE 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to, or receiving information from, a user, such as a speaker, a microphone, a keypad, a keyboard, a display or a touch screen, including network interface communications.

In addition, the UE 110 includes at least one memory 208. The memory 208 stores instructions and data used, generated or collected by the UE 110. For example, the memory 208 could store software instructions or modules configured to implement some or all of the functionality and/or embodiments described herein and that are executed by the processing unit 200. Each memory 208 includes any suitable volatile and/or non-volatile storage and retrieval device. Any suitable type of memory may be used, such as a random access memory (RAM), a read only memory (ROM), a hard disk, an optical disc, a subscriber identity module (SIM) card, a memory stick, a secure digital (SD) memory card and the like.

As illustrated in FIG. 3, the base station 170 includes at least one processing unit 350, at least one transmitter 352, at least one receiver 354, one or more antennas 356, at least one memory 358 and one or more input/output devices or interfaces 366. A transceiver (not shown) may be used instead of the transmitter 352 and the receiver 354. A scheduler 353 may be coupled to the processing unit 350. The scheduler 353 may be included within, or operated separately from, the base station 170. The processing unit 350 implements various processing operations of the base station 170, such as signal coding, bit scrambling, data processing, power control, input/output processing or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, a microcontroller, a digital signal processor, a field programmable gate array or an application specific integrated circuit.

Each transmitter 352 includes any suitable structure for generating signals for wireless or wired transmission to one or more UEs 110 or other devices. Each receiver 354 includes any suitable structure for processing signals received wirelessly or by wire from one or more UEs 110 or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter 352 and one or more separate antennas 356 could be coupled to the receiver 354. Each memory 358 includes any suitable volatile and/or non-volatile storage and retrieval device(s) such as those described above in connection to the UE 110. The memory 358 stores instructions and data used, generated or collected by the base station 170. For example, the memory 358 could store software instructions or modules configured to implement some or all of the functionality and/or embodiments described above and that are executed by the processing unit 350.

Each input/output device 366 permits interaction with a user or other devices in the network. Each input/output device 366 includes any suitable structure for providing information to or receiving/providing information from a user, including network interface communications.

Additional details regarding the UE 110 and the base stations 170 are known to those of skill in the art. As such, these details are omitted here for clarity.

5G NR uses two frequency ranges: Frequency Range 1 (FR1), including frequency bands in the range 410 MHz to 7125 MHz; and Frequency Range 2 (FR2), including frequency bands in the range 24250 MHz to 52600 MHz, but most likely in the 26 GHz to 39 GHz range. The maximum channel bandwidth for the FR1 frequency range is 100 MHz and the maximum channel bandwidth for the FR2 frequency range is 400 MHz. Notably, 1966.08 MHz is the 5G NR sampling frequency.

A table 400, illustrated in FIG. 4, provides an overview of various options currently available for 5G NR. The SCS options for FR1 include 15 kHz, 30 kHz and 60 kHz. The SCS options for FR2 include 60 kHz, 120 kHz and 240 kHz. The CP duration options for FR1 include normal CP for an SCS option set to 15 kHz, 30 kHz and 60 kHz, and extended CP for an SCS option set to 60 kHz. The CP duration options for FR2 include normal CP for an SCS option set to 60 kHz, 120 kHz and 240 kHz, and extended CP for an SCS option set to 60 kHz.

When the SCS option is set to 15 kHz for FR1, 50 MHz is the maximum channel bandwidth (BW). When the SCS option is set to 30 kHz for FR1, 100 MHz is the maximum channel BW. When the SCS option is set to 60 kHz for FR1, 100 MHz is the maximum channel BW. When the SCS option is set to 60 kHz for FR2, 200 MHz is the maximum channel BW. When the SCS option is set to 120 kHz for FR2, 400 MHz is the maximum channel BW. When the SCS option is set to 240 kHz for FR2, 400 MHz is the maximum channel BW.

When 5G numerology is considered closely, several issues may be identified. One issue is that it may be considered that the SCS options defined for 5G NR do not sufficiently support large-BW signals in higher frequency bands. For example, it may be shown that the 120 kHz SCS option, when used for FR2 frequency ranges, is not high enough to support the high millimeter Wave ("mmW" e.g., >70 GHz) and the THz bands. For example, the 120 kHz SCS option could lead to inter-carrier interference, due to the higher carrier frequencies in FR2 frequency ranges.

The 3GPP has specified two types of CPs for 5G NR: Normal Cyclic Prefix (NOP); and Extended Cyclic Prefix (ECP). NCP is specified for all 5G NR SCS options. ECP is currently only specified for the 60 kHz SCS option. If NCP is used, the CP duration of the first OFDM symbol present in every 0.5 ms is longer than the CP duration of the other OFDM symbols in 0.5 ms. Cyclic prefix durations decrease as the SCS increases. For a single CP duration solution, ECP in LTE and 5G NR has a CP overhead of 25% that may be considered to be too high for a useful OFDM symbol duration. 5G NR has no other options for single CP durations.

For a given channel bandwidth, limited SCS options and FFT size options are available to be selected and, consequently, there exists a large granularity among different symbol duration options. For example, a 30 kHz signal with NCP has roughly double the symbol duration of a 60 kHz signal. Ideally, a new scheme would feature a smaller granularity among different symbol duration options. In future networks, diverse applications may benefit from options for variable symbol durations. Such variable symbol durations may be considered to support applications for which limited power use is valued. Additionally, such variable symbol durations may be considered to support applications for which low latency is valued. Moreover, for a wide channel bandwidth, each UE may employ all of the channel bandwidth or multiple smaller portions of the channel bandwidth, i.e., a UE may use one or more sub-bands, wherein each sub-band has a sub-band bandwidth that is equal to or smaller than the channel bandwidth. In a 5G/NR network, that which is referred to in the present application as a "sub-band" is called a Bandwidth Part (BWP). While, in a 5G NR network, a single BWP is configured with only one SCS option for data transmission, more than one BWP can be configured for a given UE 110. Usually, only one BWP is active at any time for UE data transmission, thus, fixed symbol duration is used for data transmission in each BWP. In future networks, diverse applications may benefit from variable symbol durations in each sub-band, it follows that there may be benefit to configuring more than one SCS option for each sub-band. The configuring of a particular sub-band with more than one SCS option for a UE 110 or for multiple UEs 110 may be accomplished via higher layer (layer 2 or layer 3) signaling (e.g., MAC control element or Radio Resource Control) or semi-static signaling (such as Radio Resource Control), with dynamic indicating or scheduling a single SCS option for data transmission being accomplished via layer 1 (L1) signaling (such as using Downlink Control Information, or "DCI").

It may be considered that the current sampling frequency specified for 5G NR is not high enough to support high BW signals (e.g., signals with a BW that exceeds 2 GHz) in higher mmW or THz bands. In particular, a sampling frequency of 1966.08 MHz is specified for 5G NR. Typically, an electronic-based oscillator is used at a transmitter/receiver to generate a clock signal on which the sampling may be based. It is proposed herein that a higher sampling frequency will be beneficial to next generation networks. However, there may be limits to obtaining a stable, low-noise clock signal from an electronic-based oscillator at such high frequencies.

Accordingly, it is proposed that a clock signal on which to base the sampling frequency may be produced using a photonic-based oscillator.

Given that the maximum channel bandwidth, in a current 5G NR network with FR1 and FR2 frequency ranges, is 400 MHz, it follows that the current 5G NR network sampling frequency is sufficient. However, in future wireless networking standards, the carrier frequency ranges are expected to extend from 100 GHz to up 10 THz. The channel bandwidths associated with these carrier frequency ranges may be, for example, 10 GHz, 20 GHz, or above. It may be considered that the current 5G NR network sampling frequency is not high enough to process the these super high bandwidth signals. Thus, a higher sampling frequency should be considered for use in future wireless networks. Moreover, one or more sampling frequencies may be designated to employ clock signals generated with a photonic-based oscillator and/or electronic-based oscillator for different carrier frequency bands or frequency ranges.

Considering the very large variations for carrier frequency and channel bandwidth (the latter is directly associated with signals and symbol durations), the network timing references such as frame duration and sub-frame duration for system synchronization and data transmission need to be designed appropriately. For example, each network timing reference may include one or more values to accommodate these largely varying frequency ranges and channel bandwidths.

The current 5G NR FFT size options may be considered to have an efficient computation scheme. The efficiency of the known computation scheme may, in part, be due to each FFT size option being a power of two. Aspects of the present application involve employing so-called "mixed radix" DFT/FFT size options with radices of 2, 3, 4, and/or 5. A consequence of employing the mixed radix DFT/FFT size options is a greater variety of DFT/FFT size options, including the known 5G NR FFT size options and some newly added DFT/FFT size options.

Notably, the Fourier transform computational schemes on the newly added DFT/FFT size options may be considered to have an efficiency near to the efficiency of the known computation scheme.

Various FFT/DFT size options are presented in a table 500 in FIG. 5.

In a second column 502 of the table 500 of FIG. 5 are the known 5G NR FFT size options 256, 512, 1024, 2048 and 4096. Notably, the second column 502 of the table 500 of FIG. 5 provides additional FFT size options 128 and 8192, which are not part of the 5G NR FFT size options. Indeed, with the formula, $2^n*128$, and any n>6, the second column 502 of the table 500 may be extended beyond the options illustrated in FIG. 5.

In a fourth column 504 of the table 500 of FIG. 5 are additional DFT size options that follow a formula, $2^m*150$, with m∈[0, 1, 2, 3, 4, 5, 6]. Notably, for any m>6, the fourth column 504 of the table 500 may be extended beyond the options illustrated in FIG. 5. Further notably, none of the size options in the fourth column 504 of the table 500 are purely powers of two, rather each of the sizes being a multiplication of multipliers from 2, 3, 4 and/or 5. This difference from the second column 502 of the table 500 is made possible through the use of DFT instead of FFT.

In a sixth column 506 of the table 500 of FIG. 5 are additional DFT size options that follow a formula, $2^l*192$, with l∈[0, 1, 2, 3, 4, 5, 6]. Notably, for any l>6, the sixth column 506 of the table 500 may be extended beyond the options illustrated in FIG. 5. Further notably, none of the size options in the sixth column 506 of the table 500 are purely powers of two, rather each of the sizes being a multiplication of multipliers from 2, 3, 4 and/or 5. This difference from the second column 502 of the table 500 is made possible through the use of DFT instead of FFT.

As will be understood, further DFT size options beyond those presented in FIG. 5 are also available. In aspects of the present application, the following example DFT size options are also considered to be valid: 12; 36; 60; 108; 240; 324; 480; 576; 648; 900; 972; and 1152.

In aspects of the present application, the numerology of a communication system may employ DFT/FFT size options that range well beyond the limited set of 5G NR FFT size options.

Given the additional DFT/FFT size options illustrated in the table 500 of FIG. 5 and discussed hereinbefore, a set of subcarrier spacing (SCS) options can be selected based on a sampling frequency (SF), e.g., scalable (up) based on a 5G SF. The selection of a specific SF may depend on carrier frequency range.

Aspects of the present application involve obtaining a value, $M_{scs_{ij}}$, representative of a maximum SCS option for a given $i^{th}$ DFT size option, $N_{dft_i}$, selected from a set of DFT/FFT size options, in combination with a given $j^{th}$ sampling frequency, $SF_j$. That is, the maximum SCS value may be obtained from:

$$M_{scs_{ij}} = \frac{SF_j}{N_{dft_i}}.$$

Notably, the maximum SCS value, $M_{scs_{ij}}$, may only be considered useful if the maximum SCS value is rational number.

Multiple SCS options are presented in a table 600 in FIG. 6 and a table 700 in FIG. 7. FIG. 6 is for the relatively lower frequency ranges and there are three groups of subcarrier spacing, each group with one column of the table 600. The SCS values in each group are scalable as integer multiples of a base SCS value. For example, 15 kHz is a base SCS value for the group in a second column 602, 12.8 kHz is a base SCS value for the group in a third column 604 and 20 kHz is a base SCS value for the group in a fourth column 606. Note that the base SCS values of FIG. 6 in the three groups have no relationship of integer multiples. FIG. 7 is for the relatively higher frequency ranges and there are three groups of subcarrier spacing, each with one column of the table 700. The SCS values in each group are scalable as integer multiples of a base SCS value. For example, 240 kHz is a base SCS value for the group in a first column 702, 204.8 kHz is a base SCS value for the group in a second column 704 and 320 kHz is a base SCS value for the group in a third column 706. Note that the base SCS values of FIG. 7 in the three groups have no relationship of integer multiples.

In the second column 602 of the table 600 of FIG. 6 are the known 5G NR SCS options 15 kHz, 30 kHz, 60 kHz, 120 kHz and 240 kHz. The known 5G NR SCS options in the second column 602 of the table 600 of FIG. 6 correspond to the known 5G NR FFT size options in the second column 502 of the table 500 of FIG. 5. In particular, the known association between SCS options and the maximum (channel) BWs is illustrated in the table 400 in FIG. 4. Notably, the second column 602 of the table 600 of FIG. 6 provides an additional SCS option, 480 kHz, which is not part of the known 5G NR SCS options. Indeed, with the formula, $2^k*15$ kHz, and any k>5, the second column 602 of the table 600 may be extended well beyond the options illustrated in FIG. 6.

In the third column 604 of the table 600 of FIG. 6 are additional SCS options that follow a formula, $2^k*12.8$ kHz, with k∈[0, 1, 2, 3, 4, 5]. The SCS options in the third column 604 of the table 600 of FIG. 6 may be associated with the FFT size options in the fourth column 504 of the table 500 of FIG. 5. Notably, for any k>5, the third column 604 of the table 600 may be extended well beyond the options illustrated in FIG. 6.

In the fourth column 606 of the table 600 of FIG. 6 are additional SCS options that follow a formula, $2^k*20$ kHz, with k∈[0, 1, 2, 3, 4, 5]. The SCS options in the fourth column 606 of the table 600 of FIG. 6 may be associated with the FFT size options in the sixth column 506 of the table 500 of FIG. 5. Notably, for any k>5, the fourth column 606 of the table 600 may be extended well beyond the options illustrated in FIG. 6.

In a second column 702 of the table 700 of FIG. 7 are additional SCS options that follow a formula, $2^n*240$ kHz, with n∈[0, 1, 2, 3, 4, 5, 6, 7]. The SCS options in the second column 702 of the table 700 of FIG. 7 may be associated with the FFT size options in the second column 502 of the table 500 of FIG. 5. Notably, for any n>7, the second column 702 of the table 700 may be extended well beyond the options illustrated in FIG. 7.

In a fourth column 704 of the table 700 of FIG. 7 are additional SCS options that follow a formula, $2^m*204.8$ kHz, with m∈[0, 1, 2, 3, 4, 5]. The SCS options in the fourth column 704 of the table 700 of FIG. 7 may be associated with the FFT size options in the fourth column 504 of the table 500 of FIG. 5. Notably, for any m>7, the fourth column 704 of the table 700 may be extended well beyond the options illustrated in FIG. 7.

In a sixth column 706 of the table 700 of FIG. 7 are additional SCS options that follow a formula, $2^l*320$ kHz, with l∈[0, 1, 2, 3, 4, 5]. The SCS options in the sixth column 706 of the table 700 of FIG. 7 may be associated with the FFT size options in the sixth column 506 of the table 500 of FIG. 5. Notably, for any l>7, the sixth column 706 of the table 700 may be extended beyond the options illustrated in FIG. 7.

The SCS options presented in the tables 600, 700 (in FIGS. 6 and 7) may be considered to represent a capability to define a new set of available OFDM symbol durations in a single transmission time unit (TTU), for example, the SCS options in FIG. 6 may be applied to relatively lower frequency ranges and the SCS options in FIG. 7 may be applied to relatively higher frequency ranges. The new set of available OFDM symbol durations may be considered to be more useful than the current (5G NR) set of available OFDM symbol durations. The new set of available OFDM symbol durations can be shown to provide a finer granularity of OFDM symbol durations than the current (5G NR) set of available OFDM symbol durations.

Multiple SCS options and DFT/FFT options can be supported for a single channel BW.

Aspects of the present application relate to selecting an option pair for a given channel BW. An option pair includes one SCS option and a corresponding DFT size option.

With the SCS option referenced as $M_{scs_{ij}}$ and the DFT size option referenced as $N_{dft_i}$, a goal may be stated as obtaining a valid option pair, $\{M_{scs_{ij}}, N_{dft_i}\}$, for a given channel BW, $B_{CBW}$, in a particular frequency range.

In view of a factor, β (where β≥1, e.g., 1.54), the given channel BW, $B_{CBW}$, may be shown to operate with any option pair selected from a set of option pairs, as long as each option pair in the set of option pairs satisfies a condition presented in the following inequality:

$$M_{scs_{ij}} * N_{dft_i} < \beta * B_{CBW} \qquad (1)$$

The factor, β, is an engineering and estimation value used to approximately describe valid option pairs including an SCS option and a DFT size option.

A resource element (hereinafter, "RE") is a single subcarrier transmitted as part of a single OFDM symbol. It is notable that a transmitted number of REs, which number may be represented as $\#_{T_{RE}}$, can be less than $N_{dft_i}$ and $\#_{T_{RE}} * M_{scs_{ij}}$ may be referenced as a sub-band. That is, for a given channel bandwidth, $B_{CBW}$, each UE 110 may employ the entire channel bandwidth or one or more portions of the channel bandwidth. The portions, "sub-bands," each has a sub-band bandwidth, wherein any of the sub-band bandwidths is equal to or smaller than $B_{CBW}$. It follows that the scheduled/transmitted # of REs, $\#_{T_{RE}}$, can be equal to or less than $N_{dft_i}$. Moreover, a sub-band can be configured by selecting from amongst more than one SCS option and, accordingly, the sub-band can support data transmissions with different SCS options. For example, each sub-band can be configured with more than one SCS option for a UE 110 or for multiple UEs 110 via one or more of: higher layer (say, layer 2 or layer 3) signaling (e.g., MAC control element or Radio Resource Control), semi-static signaling (such as Radio Resource Control), broadcast/group-cast signaling and dynamically indicating or scheduling one SCS option for data transmission via L1 signaling (such as DCI).

A table 800 in FIG. 8 provides, in a second column 804, sets of option pairs that have been found to be suitable for supporting specific base channel BWs, in a first column 802, in the FR1 and FR2 frequency ranges. Notably, the option pairs presented in the second column 804 of the table 800 of FIG. 8 may also support specific channel BWs in the high-end mmW frequency range, where carrier frequencies are higher than the maximum frequency in the FR2 frequency range.

Not shown in FIG. 8 is the duration of the useful portion of each OFDM symbol that corresponds to each option pair. The duration of the useful portion of each OFDM symbol may be shown to increase corresponding to the decreases in the value (in kHz) of the SCS option. In one example, there are five valid option pairs for the 30 MHz channel bandwidth option. It follows that there are five OFDM symbol duration options for the 30 MHz channel bandwidth option.

For a channel BW in relatively lower frequency ranges, multiple option pairs in the table 800 of FIG. 8 can be used for signal processing in data transmission and reception, thus providing flexibility in selection and usage of a particular option pair for the channel BW. Notably, a variety of OFDM symbol durations may be employed in a single data transmission (or in a TTU). This variety can be achieved, example, through the use of Radio Resource Control (RRC) configuration and/or dynamic scheduling via Downlink Control Information (DCI).

More option pairs may be obtained by testing the inequality (1) on option pairs formed using SCS options from the table 600 of FIG. 6 and the corresponding DFT size options from the table 500 of FIG. 5. Similarly, further option pairs may be obtained by testing the inequality (1) on option pairs formed using SCS options from the table 700 of FIG. 7 and the corresponding DFT size options from the table 500 of FIG. 5.

In some cases, a CP may not be configured or used. Consequently, the useful portion of each OFDM symbol is the entire OFDM symbol. Conditions under which a CP may not be used include, for example, those situations wherein transmission channel delay spread can be neglected. As will be understood, transmission channel delay spread can be neglected such as line of sight transmission and narrow beam transmission, etc.

Given the SCS options, $\{M_{scs_{ij}}\}$, and the base channel BWs in the first column 802 of FIG. 8, the inequality (1) can be applied to any SCS option scaled up by an integer, k, that is obtained by raising two to an integer power (k=$2^l$, l=0, 1, 2, 3, . . . ) to obtain valid option pair for a higher channel bandwidth, $B'_{CBW}$, in the relatively higher frequency ranges, described in the following.

In view of a factor, β (where) β≥1, e.g., 1.54), and a given SF, $SF_j$, the higher channel bandwidth, $B'_{CBW}$, may be shown to operate with any option pair selected from a set of option pairs, $\{M_{scs_k}, N_{dft_i}\}$, where $M_{scs_k} = M_{scs_{ij}} * k$, and k is a non-negative integer, as long as each option pair in the set of option pairs satisfies a condition presented in the following inequality for i and k:

$$M_{scs_k} * N_{dft_i} < \beta * B'_{CBW} \qquad (2)$$

In a first example, consider that the higher channel bandwidth, $B'_{CBW}$, is 800 MHz. It is noted that a k=4 converts a base channel BW of 200 MHz to the higher channel bandwidth, $B'_{CBW}$. It follows that an option pair can be obtained by scaling up, by a multiple of four, an SCS option portion among the two option pairs associated with the base channel BW of 200 MHz in the table 800 in FIG. 8. The first option pair, with an SCS option of 160 kHz and a DFT size option of 1536 can be scaled up to an SCS option of 640 kHz (4*160 kHz) paired with the same DFT size option, 1536. The second option pair, with an SCS option of 80 kHz and a DFT size option of 3072 can be scaled up to an SCS option of 320 kHz (4*80 kHz) with the DFT size option, 3072.

In a second example, the higher channel bandwidth, $B'_{CBW}$, remains 800 MHz. It is noted that a k=8 converts a base channel BW of 100 MHz to the higher channel bandwidth, $B'_{CBW}$. It follows that an option pair can be obtained by scaling up, by multiplying by eight, an SCS option portion among the three option pairs associated with the base channel BW of 100 MHz in the table 800 in FIG. 8.

The first option pair, with an SCS option of 160 kHz and a DFT size option of 768 can be scaled up to an SCS option of 1280 kHz (8*160 kHz) paired with the same DFT size option, 768. The second option pair, with an SCS option of 80 kHz and a DFT size option of 1536 can be scaled up to an SCS option of 640 kHz (8*80 kHz) with the DFT size option, 1536. The third option pair, with an SCS option of 40 kHz and a DFT size option of 3072 can be scaled up to an SCS option of 320 kHz (8*40 kHz) with the DFT size option, 3072.

For the relatively higher frequency ranges, a channel bandwidth $B'_{CBW}$ can be even (much) higher than $B_{CBW}$, thus each UE may occupy all or smaller portions of the channel bandwidth, i.e., sub-bands each being equal or smaller than $B_{CBW}$, and thus, the scheduled/transmitted # of REs can be equal to or less than $N_{dft_i}$. As discussed hereinbefore, a sub-band can be configured more than one SCS option and support data transmissions with different SCS options in the sub-band; for example, each sub-band can be configured with more than one SCS option for a UE 110 or for multiple UEs 110 via higher layer signaling or semi-static signaling (such as RRC), and dynamically indicating or scheduling one SCS for data transmission via L1 signaling (such as DCI).

CP duration (or CP time length), $T_{cp}$, is preferably an integer multiple of the number of samples, that is, $$\frac{1}{SF_j}.$$

One OFDM symbol duration, $T_{ofdm}$, is related to the CP duration by $T_{ofdm} = T_{cp} + T_u$, where $T_u$ is duration of the useful portion of the OFDM symbol. $T_u$ may be found as $$T_u = \frac{1}{SCS \text{ option}} = \frac{1}{M_{scs_k}}.$$

CP duration, $T_{cp}$, can be found on the basis of a relationship with $T_u$ in conjunction with selected integers n and F, expressed as $$T_{cp} = \frac{nT_u}{F},$$

with $$T_u = \frac{1}{SCS \text{ option}}.$$

F is associated with the mixed radix, 2/3/4/5, for generating DFT sizes, which is a multiplication of one or more radices selected from among 2, 3, 4 and 5. It may be shown that this relationship between $T_{cp}$ and $T_u$ may be applied to the SCS options in lower carrier frequency bands such as the FR1 bands and the FR2 bands in addition to carrier frequency bands in the higher carrier frequency ranges, such as high-end mmW band and THz bands. Notably, there exists a possibility that no CP is configured to a symbol. In such a case, $T_{cp}$ is equivalent to zero.

Two categories of (CP type or) CP duration are provided, herein referenced as: a Category 1 scheme (i.e., a single CP duration option); and a Category 2 scheme (i.e., two-CP duration options).

CP design may include taking into consideration an effort to fit one or more OFDM symbols into a reference duration. That is, one or more OFDM symbol durations may align, in time, with a frame duration, a sub-frame duration or a slot duration. The term "sub-frame" used here may or may not be same as the term "sub-frame" when used in the context of 5G NR in terms of duration value for timing reference. The term "slot" used here may or may not be same as the term "slot" when used in the context of 5G NR in terms of having a specific number of OFDM symbols of symbols in a slot.

Figure 9:
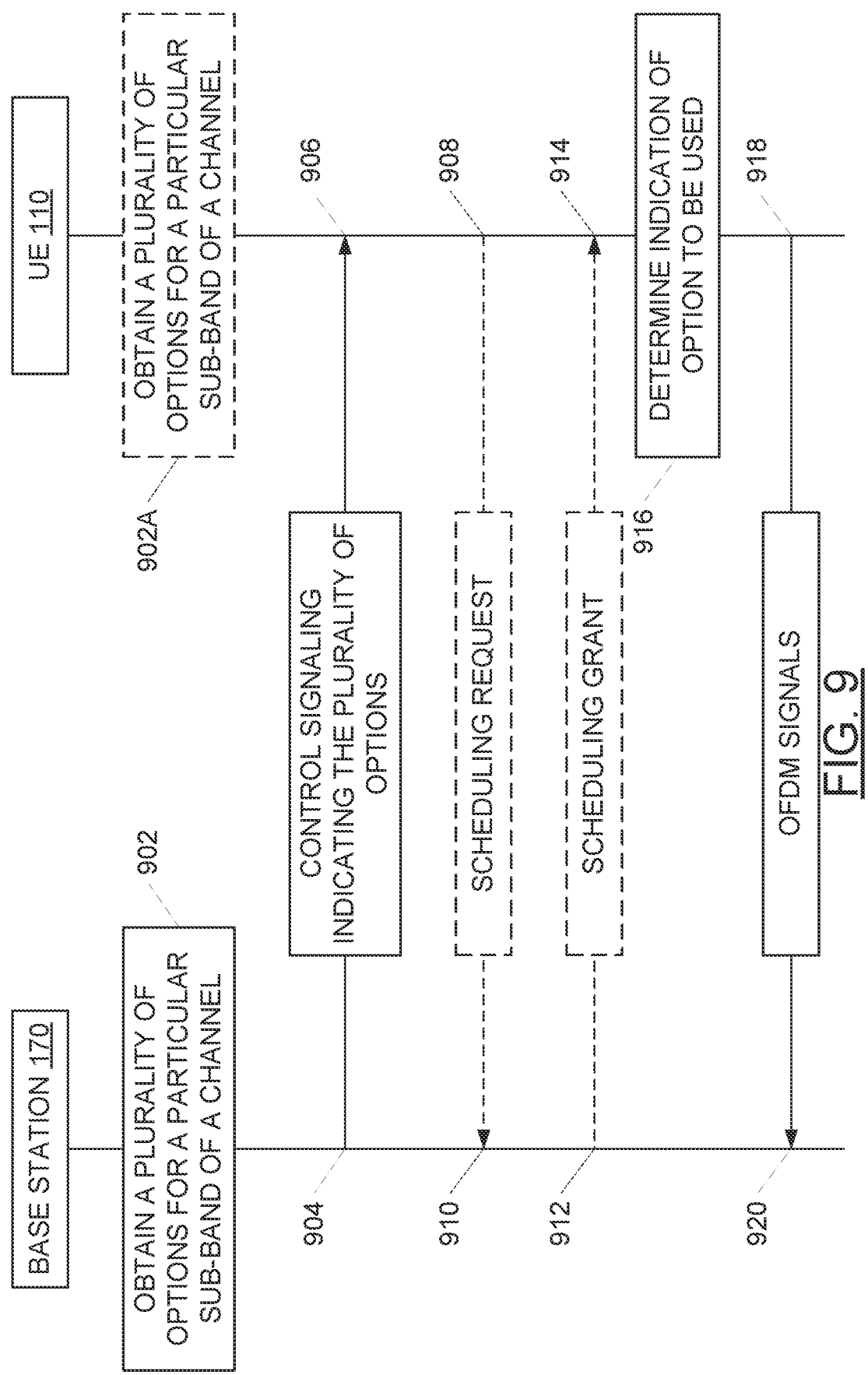
FIG. 9 illustrates an example signal flow diagram representative of a method selecting, according to aspects of the present application, from among the options presented in FIG. 8 for a communication session in a network.

FIG. 9 illustrates an example signal flow diagram representative of a method of configuring options for a communication session in a network, here the communication session can be uplink transmission and/or downlink transmission in a carrier frequency band from among the relatively lower frequency ranges (such as FR1 and FR2 frequency ranges) or a carrier frequency band from among the relatively higher frequency ranges (such as higher-end high millimeter Wave frequency bands and THz frequency bands), the communication session to take place in a channel, the channel having a particular channel bandwidth. One or more sub-bands may be defined for use within the channel bandwidth. A base station 170, carrying out the method represented by the signal flow diagram of FIG. 9, initially obtains (step 902) a plurality of SCS options for a particular sub-band of the channel, each SCS option among the plurality of SCS options being associated with at least one DFT size option and at least one CP duration option. It should be clear that the base station 170 may obtain (step 902) the plurality of parameter options in the form of a table of the sort illustrated in FIG. 8 or FIG. 19 to be addressed in a following section. The base station 170 may then transmit (step 904) control signaling to the UE 110, wherein the control signaling includes options for use for the communication session. The options may include an indication of the plurality of SCS options for transmitting OFDM symbols (or signals) within the sub-band of the channel associated with a particular channel BW. The options may also include an indication of the plurality of DFT size options, associated with the plurality of SCS options obtained in step 902, for transmitting OFDM symbols (or signals) within the sub-band of the channel. The options may also include an indication of the plurality of (CP type or) CP duration options, associated with the plurality of SCS options obtained in step 902, for transmitting OFDM symbols (or signals) within the sub-band of the channel. The options may also include an indication of a plurality of sampling frequency options, associated with the plurality of SCS options obtained in step 902, for transmitting OFDM symbols (or signals) within the sub-band of the channel. Subsequently, the UE 110 receives (step 906) the control signaling. Note that the carrier frequency band is one of a plurality of carrier frequency bands including the known frequency ranges F1, F2 and the Terahertz bands.

Alternatively, the UE 110 may obtain (step 902A) the plurality of SCS options, associated plurality of CP options and associated plurality of DFT size options, for the particular sub-band of the channel and determine one SCS option, CP option and one associated DFT size option in a pre-defined way for the particular sub-band of the channel in the carrier frequency band, for example, during an initial network access entry, a handover procedure, or grant-free/configured grant transmission for the UE 110. Thus, the UE 110 is able to perform data transmission or reception without at least the scheduling request step (step 908).

It is well known that there are multiple options for the UE 110 to learn of an availability for communicating with the base station 170. In one option, the UE 110 transmits (step 908) a scheduling request to the base station 170 for, e.g., a data transmission or/and a state transition. The base station 170 receives (step 910) the scheduling request and, responsively, transmits (step 912) a scheduling grant to the UE 110 for, e.g., the data transmission or/and the state transition. Upon receiving (step 914) the scheduling grant, the UE 110 may obtain (step 916), from the scheduling grant, an indication of one SCS option from among the plurality of SCS options. The UE 110 may then communicate (step 918) OFDM symbols with the base station 170 using the one SCS option in the sub-band. The base station 170 similarly communicates (step 920) the OFDM symbols using the one SCS option.

In another option, the UE 110 does not transmit a scheduling request to the base station 170. Instead, the base station 170 (autonomously or based on demand) transmits (step 912) a scheduling grant to the UE 110. Upon receiving (step 914) the scheduling grant, the UE 110 may find (step 916), in the scheduling grant, an indication of one specific SCS option from among the plurality of SCS options. The UE 110 may then transmit (step 918) OFDM symbols (or signals) to the base station 170 using the one specific SCS option in the sub-band. The base station 170 subsequently receives (step 920) the OFDM symbols.

In an even further option, the base station 170 does not transmit a (dynamic) scheduling grant to the UE 110. Instead, the base station 170 includes, when transmitting (step 904) the control signaling to the UE 110, an indication of a default active SCS option among the plurality of SCS options. Accordingly, rather than determining (step 916) the indication of one specific SCS option from the (dynamic) scheduling grant, the UE 110 may determine (step 916) the indication of the default active SCS option from the control signaling received in step 906. The UE 110 may then transmit (step 918) OFDM symbols (or signals) to the base station 170 using the default active SCS option in the sub-band. The base station 170 subsequently receives (step 920) the OFDM symbols.

Not shown in FIG. 9 for the last step (918 to 920), the transmission can be downlink direction as well, where the base station 170 subsequently sends the OFDM symbols (or signals) to the UE 110. In this case, the indication of the default active SCS option from the control signaling received in step 906 may include at least one default active SCS, share by uplink and downlink, or include two default active SCSs used by uplink and downlink, respectively.

In aspects of the present application, the transmission, in step 904, of the control signaling to the UE 110 can be accomplished via higher layer (say, layer 2 or layer 3) signaling (e.g., MAC CE or RRC) or semi-static signaling (such as RRC) and the transmission, in step 912, of the scheduling grant, of an indication of one specific option from among the plurality of parameter options is accomplished via L1 signaling (such as DCI), or via MAC control element (CE). Additionally, or alternatively, the control signaling in step 904 may be transmitted to more than one UE as a broadcast or group-case signaling.

Figure 11:
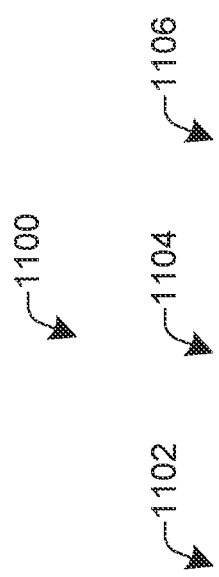
FIG. 11 illustrates a table of examples of CP duration associated with SCS for a 25% overhead, according to aspects of the present application.

A table 1000 in FIG. 10 and a table 1100 in FIG. 11 provide examples of CP duration following the Category 1 scheme for the relatively lower (carrier) frequency bands in view of a sampling frequency of 30.72 MHz. In the Category 1 scheme, the CP durations for different SCS options have a scalable relationship for a given CP overhead (or in each table). Specifically, CP duration is inversely scalable (in terms of a power of two) with the SCS option as can be seen in a review of the CP duration and SCS option pairs in the table 1000 of FIG. 10 and the table 1100 in FIG. 11.

The table 1000 of FIG. 10 includes a column 1002 of CP durations, a column 1004 of SCS options and a column 1006 indicating overhead. Similarly, the table 1100 of FIG. 11 includes a column 1102 of CP durations, a column 1104 of SCS options and a column 1106 indicating overhead.

In one example, in the table 1000 in FIG. 10, when the CP duration, $T_{cp}$, is halved from 2.08 μs to 1.04 μs, the SCS option doubles from 120 kHz to 240 kHz.

For the Category 2 CP design scheme, the SCS option may be associated with an SCS option index, μ, such that each SCS option=$2^\mu$*15 kHz. Accordingly, the SCS options known from 5G NR, 15, 30, 60, 120 and 24, are associated with an SCS option index, μ=0, 1, 2, 3 and 4. Useful OFDM symbol duration and CP duration, previously associated with $T_u$ and $T_{cp}$, respectively, and measured in μs in the Category 1 scheme are associated, in the Category 2 scheme, with $N_u$ and $N_{cp}$, respectively, and measured in number of samples. To arrive at this number-of-samples representation, several further terms may be defined, including sample duration, $T_r$. Additionally, two constants may be defined, in terms of $T_r$, as $$\hbar = \frac{1000}{30.72 * T_r} \text{ and } \varsigma = \frac{16000}{30.72 * T_r}.$$

A table 1200 in FIG. 12 includes a first column 1202 for SCS option index, μ, a second column 1204 for SCS option and a third column 1206 for indicating whether only normal CP or both normal CP and extended CP are available for the corresponding selection of SCS option.

For Category 2 CP design, a useful OFDM symbol duration, $N_u^\mu$, valid when using the SCS option with the index, μ, may be expressed, in terms of number of samples (each sample duration being $T_r$) based on sampling frequency rate of $1/T_r$, as $N_u^\mu = T_r * 2048 Ti * 2^{-\mu}$. In a given time interval, normal CP duration for an $l^{th}$ symbol using the SCS option with the index, μ, in terms of number of samples, may be given by:

$$N_{cp,l}^\mu = \begin{cases} T_r * 144 \hbar * 2^{-\mu} * T_r * \varsigma & l = 0 \text{ or } l = 7 * 2^\mu \\ T_r * \hbar 144 * 2^{-\mu} & l \neq 0 \text{ or } l \neq 7 * 2^\mu \end{cases}.$$

Initially, for a first embodiment, an SCS option may be selected based on transmission demand and/or channel conditions. Subsequently, a CP duration can be selected, in part, on the basis of channel conditions and transmission environment factors. Transmission environment factors may, for example, include multiple path spread delay and Doppler impact. The CP duration can be selected based on either a Category 1 scheme or a Category 2 scheme, while keeping in mind that the CP duration should contain an integer number of samples.

A second embodiment may be considered a restriction of the first embodiment with a further condition. The condition involves selecting the CP duration in a manner that allows the OFDM symbols to fit into a reference timing unit (or duration). That is, one or more OFDM symbol durations may align, in time, with the reference timing duration; while the CP duration can be found based either on a Category 1 scheme or on a Category 2 scheme and associated with the SCS option. Three examples are given in FIG. 13.

A table 1300 in FIG. 13 includes (Category 1 type) CP durations specified for three distinct SCS options in high frequency ranges. In the table 1300 of FIG. 13, there is a column 1302 for CP duration, $T_{cp}$, a column 1304 for SCS option and a column 906 for CP overhead, $$\frac{T_{cp}}{T_u}.$$

For a first SCS option, 3276.8 kHz, two CP durations are provided, one CP duration, 20.3 μs, is provided for a 6.70% CP overhead setting and another CP duration, 85.4 μs, is provided for a 28% CP overhead setting. For a second SCS option, 6553.6 kHz, two CP durations are provided, one CP duration, 10.2 μs, is provided for a 6.70% CP overhead setting and another CP duration, 42.7 μs, is provided for a 28% CP overhead setting. For a third SCS option, 13107.2 kHz, two CP durations are provided, one CP duration, 5.1 μs, is provided for a 6.70% CP overhead setting and another CP duration, 21.4 μs, is provided for a 28% CP overhead setting.

Accordingly, a network entity is able to choose a particular CP duration (or CP type) based, at least in part, on channel characteristics. Note that with a reference time duration, one or more OFDM symbols can be time-aligned with the reference time duration. Furthermore, one CP duration (or CP) option from a group of the CP duration (or CP) options can be chosen for one SCS with more or more OFDM symbols to be aligned with the reference time duration. In some embodiments, one CP may be used to protect multiple OFDM useful symbols, where one CP is followed by more than one useful OFDM symbol, and the CP signal is constructed from the more than one useful OFDM symbol in a way as if the more than one useful OFDM symbol were a single useful OFDM symbol. This is especially beneficial to communication scenarios in very high carrier frequency band(s), where the SCS is very large and, thus, each useful OFDM symbol period is also very small (e.g., 0.01 μs to a few μs). For example, one CP with duration of a few microseconds (which is still good to combat the multipath impacts) can be used to protect several useful OFDM symbols each with symbol duration of a few microseconds to reduce CP overhead (as comparing to the case where each useful OFDM symbol is using one CP with duration of a few microseconds). In this case, both transmitter and receiver ends may need to encode and decode such constructed signals based for each of symbol groups, where a symbol group consists of more than one useful OFMD symbol.

A table 1400 in FIG. 14 includes (Category 1 type) CP durations specified for particular SCS option, a particular reference duration and a variety of numbers of OFDM symbols. More specifically, each entry in a first column 1402 corresponds to a particular number of OFDM symbols that are able to fit into the reference duration of the same row in a column 1406, where each OFDM symbol uses the CP duration of the same row in a column 1404, and the SCS option in a column 1408.

Figure 15:
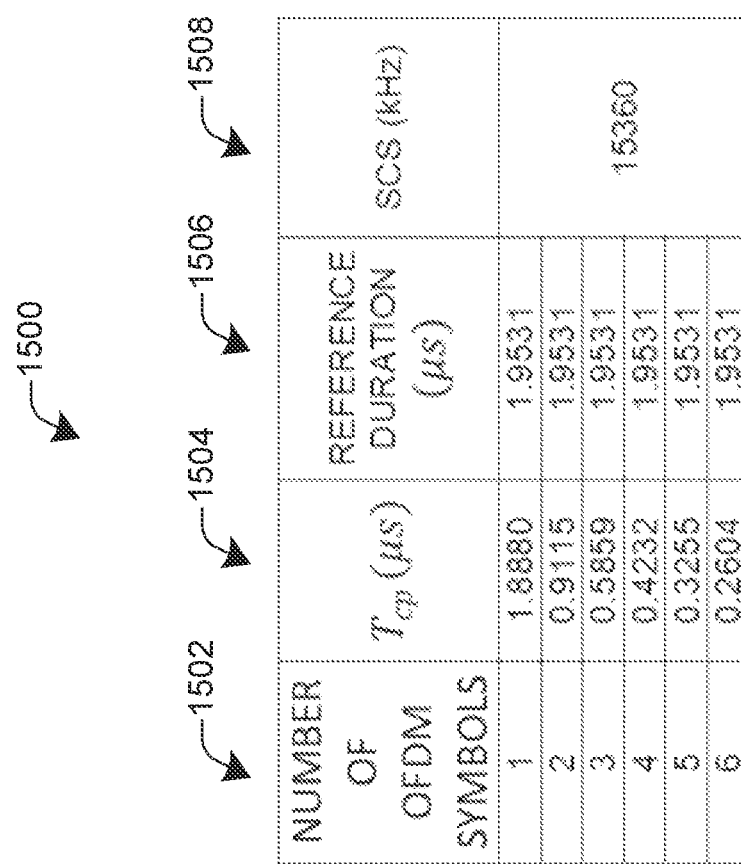
FIG. 15 illustrates a table of CP durations specified for a particular SCS option (distinct from the SCS option of FIG. 14), a particular reference duration and a variety of numbers of OFDM symbols, according to aspects of the present application.

In a manner similar to the table 1400 of FIG. 14, a table 1500 in FIG. 15 includes (Category 1 type) CP durations specified for a particular SCS option, a particular reference duration and a variety of numbers of OFDM symbols. More specifically, each entry in a first column 1502 corresponds to a particular number of OFDM symbols that are able to fit into the reference duration of the same row in a column 1506, where each OFDM symbol uses the CP duration of the same row in a column 1504, and the SCS option in a column 1508.

The table 1400 of FIG. 14 differs from the table 1500 of FIG. 15 in that the table 1400 of FIG. 14 relates to an SCS option of 7670 kHz and the table 1500 of FIG. 15 relates to an SCS option of 15360 kHz. For both tables 1400, 1500, the reference duration is 1.9531 µs, which is one 256th of 500 µs.

In the specified reference duration, a single OFDM symbol with a CP duration of 1.8880 µs may be scheduled. Alternatively, multiple (2-6) OFDM symbols may be scheduled, each with a CP duration shorter than 1.8880 µs. As stated hereinbefore, a CP duration in a scheduling message to a UE or a group of UEs can be changed dynamically or semi-statically, that may be based on factors such as channel conditions, mobility, and/or transmission conditions. Moreover, each UE may occupy all or smaller portions of a (configured) channel bandwidth, i.e., sub-bands (or BWPs) each being equal or smaller than the (configured) channel bandwidth and configuring more than one SCS option and/or more than one CP duration option. In some embodiments, each sub-band can be configured with more than one SCS option and/or more than CP duration option for a single UE 110 or for multiple UEs 110 via higher layer signaling or semi-static signaling (such as RRC), and dynamically indicating or scheduling one SCS option and/or CP duration option for data transmission via L1 signaling (such as DCI) or via MAC CE. In other embodiments, each sub-band can be configured with more than one or more SCS options and each SCS option may be associated with one or more CP duration options explicitly configured as well or implicitly indicated (e.g., by table mapping, or predefinition) for a single UE 110 or for multiple UEs via higher layer signaling or semi-static signaling (such as RRC), and dynamically indicating or scheduling one SCS option and/or CP duration option for data transmission via L1 signaling (such as DCI) or via MAC CE. In the embodiments above, each SCS option is associated with one or more DFT/FFT size options explicitly configured as well or implicitly indicated (e.g., by table mapping, or predefinition). As a result, in an active sub-band, a different combination of a SCS option, a CP duration option and a DFT/FFT size option may be used in each data transmission (step 918, FIG. 9) or data reception. For example, the scheduler 353 (FIG. 3) can dynamically grant these options for flexible data transmissions to support different applications or different types of traffic using, e.g., variable symbol durations.

Figure 16:
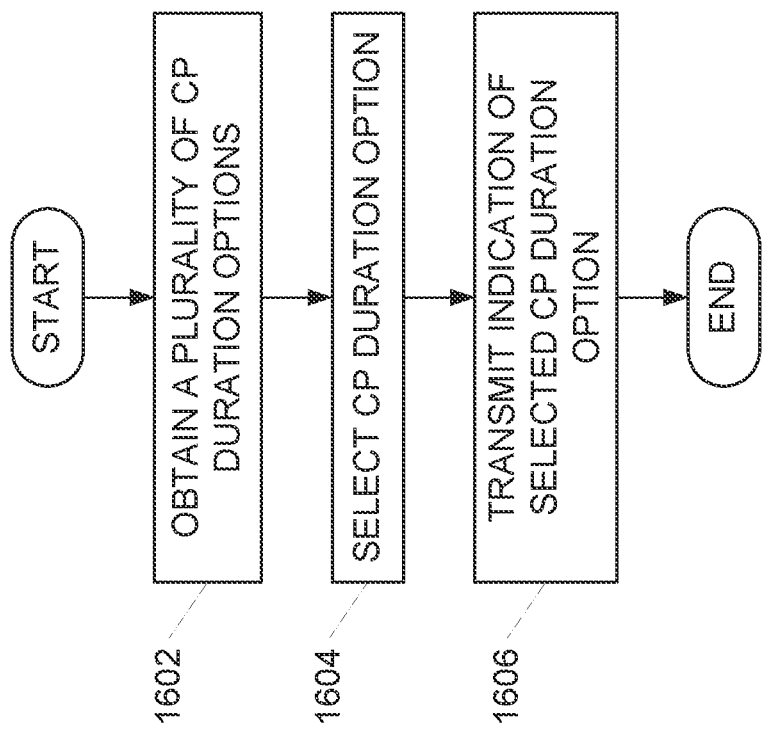
FIG. 16 illustrates example steps in a method selecting from among options for a communication session in a network, according to aspects of the present application.

FIG. 16 illustrates example steps in a method of configuring options for a communication session in a network, the communication session having a particular subcarrier spacing. A base station 170 carrying out the method of FIG. 16 initially obtains (step 1602) a plurality of CP duration options for the particular subcarrier spacing. It should be clear that the base station 170 may obtain (step 1602) this information as a table of the sort illustrated in FIG. 14 and FIG. 15. The base station 170 may then select (step 1604), for use for the communication session, a particular CP duration option from among the plurality of CP duration options. The base station 170 may carry out the selecting (step 1604) by performing a table look-up operation in a table of the sort illustrated in FIG. 14 and FIG. 15, which has been obtained in step 1602. Once the base station 170 has completed the selection step (steps 1604), the base station 170 may transmit (step 1606) an indication of the CP duration option to one or more of the UEs 110.

Future networks may employ two base sampling frequencies due to the two possible manners of signal generation.

One manner of signal generation involves use of an electronic-based oscillator. The output of an electronic-based oscillator is generally considered useful for generating sampling frequencies used in mmW bands and lower-frequency bands. For example, LTE and NR OFDM high frequency signal generation is known to be accomplished using an electronic-based oscillator. The known 5G NR sampling frequency is 1966.08 MHz, which is based on the known LTE sampling frequency, 30.72 MHz. Indeed, 1966.08=30.72*64.

For future networks, the sampling frequency for mmW bands and lower frequency bands may be the same as the sampling frequency used in 5G NR. Alternatively, the sampling frequency for mmW bands and lower frequency bands may be a multiple of 30.72 MHz. For example, the sampling frequency, $SF_j$, for the so-called the relatively lower frequency ranges (or bands) may be obtained as $SF_j=k*30.72$ kHz, where k is a positive integer. More restrictively, k may be defined by $k=2^l$, where l is a non-negative integer.

Another manner of signal generation involves use of a photonic-based oscillator, which may be used in these future networks as a basis for the sampling frequency for THz bands. In some embodiments, a future device, UE or network node may generate photonic-based signals, electronic-based signals, or a hybrid of photonic-based and electronic-based signals. In fact, these two types of signals may complement each other and overcome the mutual shortcomings in different scenarios or environments.

It is contemplated herein that, for future networks, the sampling frequency or base clock timing may be distinct from the sampling frequency used in 5G NR and the sampling frequency used in LTE. Instead, aspects of the present application propose that the sampling frequency for the relatively higher frequency ranges or THz bands may be a multiple of a base sampling frequency, $SF_o$, which is not 30.72 MHz and not any of its (30.72 MHz) scalable values with integer multiples. For example, the sampling frequency, $SF_H$, for the so-called higher frequency bands may be obtained as $SF_H=k*SF_o$ kHz, where k is a positive integer. More restrictively, k may be defined by $k=2^l$, where l is a non-negative integer. In some embodiments, there are two system sampling frequencies in the future network: one is for the relatively lower frequency ranges and the other for the relatively higher frequency ranges. In other embodiments, there is more than one system sampling frequency, each used for signal processing with different channel bandwidths. In another embodiment, there is only one system sampling frequency used for all frequency bands.

Figure 17:
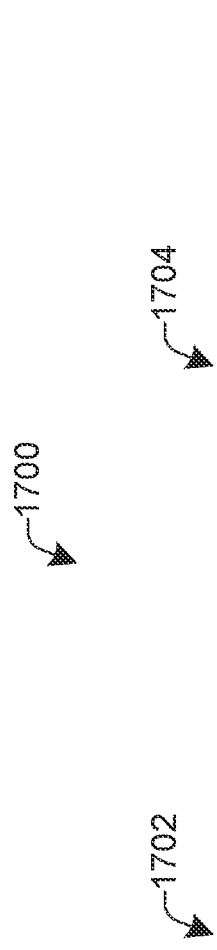
FIG. 17 illustrates a table that provides options for sampling frequency for future networks, according to aspects of the present application.

A table 1700 in FIG. 17 provides options for sampling frequency for future networks. A first column 1702 indicates whether a set of frequency bands is lower or higher. A second column 1704 provides a set of candidate sampling frequencies for future network. If more than one sampling frequency is used in the future network, an association between each sampling frequency with one or more frequency bands or channel bandwidths can be pre-defined (e.g., in a table), or/and semi-statically configured by higher-layer signaling (e.g., via RRC).

FIG. 18 illustrates example steps in a method selecting from among options for a communication session in a network, the communication session occurring in a particular frequency band. A base station 170 carrying out the method of FIG. 18 determines (step 1802) a plurality of sampling frequency options based on a particular frequency band or/and a channel bandwidth. There should be a pre-defined table of the sort illustrated in FIG. 17 or a pre-defined table with a mapping between a plurality of sampling frequency options and one or more frequency bands/ranges. The base station 170 may obtain (step 1802) this information using the pre-defined table. The base station 170 may then select (step 1804), for use for the communication session, the particular sampling frequency from among the plurality of sampling frequency options. The base station 170 may perform the selection (step 1804) as a table look-up operation. Once the base station 170 has completed the selection step (step 1804), the base station 170 may transmit (step 1806) an indication of the sampling frequency option (for one or more carrier frequency bands) to one or more of the UEs 110 via higher layer signaling (such as RRC), semi-static signaling, or/and broadcast/group-cast signaling. This can be the case for the base station 170 to make certain sampling frequency configurations, for example, where there are more than one sampling frequency in the network and when a UE 110 has completed its initial network entry with a default or pre-defined sampling frequency.

In other embodiments, the UE 110 may perform an initial access to network by selecting a particular sampling frequency based on its operational frequency band or/and channel bandwidth using the predefined table with a look-up operation and no signaling on the sampling frequency option is required from the base station for the initial network entry.

There are several distinct approaches to selecting one or more sampling frequencies.

In a first approach, the one sampling frequency associated with the relatively lower frequency bands/ranges may be selected for lower frequency bands, such as the FR1 frequency bands and the FR2 frequency bands in 5G NR. Additionally, or alternatively, a further sampling frequency may be selected for higher frequency bands, such as around THz bands. The further sampling frequency may be selected from among: the sampling frequency, 7864.32 MHz, associated with higher (option 1); the sampling frequency, 15728.64 MHz, associated with higher (option 2); the sampling frequency, 31457.28 MHz, associated with higher (option 3); and the sampling frequency, 62914.56 MHz, associated with higher (option 4).

In a second approach, the one sampling frequency associated with the lower frequency bands may be selected for lower frequency bands, such as the FR1 frequency bands and the FR2 frequency bands in 5G NR. Additionally, or alternatively, more than one further sampling frequency may be selected for higher frequency bands, such as around THz bands. The more than one further sampling frequency may be selected from among the sampling frequencies associated with: higher (option 1); higher (option 2); higher (option 3); and higher (option 4).

In a third approach, only one sampling frequency is selected and is used across the full range of operating frequency bands. Notably, this approach simplifies implementation.

In a fourth approach, more than one sampling frequency may be selected for all frequency bands. That is, the one sampling frequency associated with the lower frequency bands may not be selected for higher frequency bands. The more than one sampling frequency may be selected from among the sampling frequency options associated with: higher (option 1); higher (option 2); higher (option 3); and higher (option 4).

In a fifth approach, selecting is not accomplished dynamically, instead, the sampling frequency, among the multiple options, is pre-defined or pre-configured (semi-statically or using RRC signaling) for use by the base stations 170 and the UEs 110 in the communication system 100 of FIG. 1.

In a sixth approach, sampling frequency configuration may be associated with the configuration of an SCS option, a DFT size option and/or a particular channel bandwidth. A relationship between the configuration details may be tabulated, thereby providing a mapping between two or more of sampling frequency, channel BW, SCS option and DFT size option. For large channel BW, e.g., a 10 GHz channel BW, the channel may be divided into a plurality of sub-bands with each sub-band having a sub-band BW that is equal to or smaller than the channel BW, thereby allowing for parallel processing on the sub-bands, including parallel signal processing among different channel BWs. The sampling frequency options for different channel BWs can be different and be pre-defined or semi-statically configured (e.g., via RRC signaling). Different sub-bands can be configured to a UE with different channel BWs and with different sampling frequencies, which may be pre-defined or semi-statically configured (e.g., via RRC signaling).

Frame duration is used for frame synchronization/timing. More than one frame duration may be configured in view of the variety of frequency ranges and channel bandwidth ranges, where at least one frame duration is used as a reference frame duration or base frame duration. One or more frame durations may be selected from among 1 ms or {10, 5, 2.5, . . . } milliseconds (ms), which may be generally represented as:

$$\frac{10}{2^m} \text{ ms, with } m = 0, 1, 2, \ldots$$

Frame duration parameters can be predefined or configured semi-statically and/or dynamically.

Sub-frame duration may be defined for any one or more among multiple purposes, such as a desire for a scheduling time unit, a receiving time alignment reference, a transmission time alignment reference, etc.

There could be more than one sub-frame time duration in view of the variety of frequency ranges and channel bandwidth ranges, where at least one sub-frame duration is used as a reference sub-frame duration or as a base sub-frame duration.

One or more sub-frame durations may be selected from among 0.1 ms or {1, 0.5, 0.25, . . . } ms, which may be generally represented as:

$$\frac{1}{2^k} \text{ ms, with } k = 0, 1, 2, \ldots$$

Sub-frame duration parameters can be predefined or configured semi-statically (e.g., via RRC) and/or dynamically (e.g., via DCI).

A scheduling time unit can be as small as one OFDM symbol for transmission, whose timing reference is based on the frame duration and sub-frame duration defined hereinbefore. One transmission time unit can be one slot duration where the slot may consist of one or more OFDM symbols, and the number of symbols per slot can be fixed or variable depending on configuration; the configuration can be semi-static or dynamic, higher-layer signaling (via RRC) or L1 signaling (via DCI).

FIG. 19 illustrates a table 1900 that provides associations between sub-band options, SCS options, CP duration options and DFT size options for future networks, according to aspects of the present application. Each entry in a first column 1902 references a sub-band option, which may be expressed as a number of resource blocks, where each resource block includes multiple resource elements or sub-carriers spaced by its SCS value in the same row, e.g., by $M_{scs_0}$ in the second row. A second column 1904 includes a reference to an SCS option. A third column 1906 includes a reference to one or more CP duration options associated with the SCS option in the second column 1904. The third column 1906 may, for example, include Category 1 Type CP duration options from FIG. 10, FIG. 11, FIG. 13, FIG. 14 and FIG. 15. A fourth column 1908 includes a reference to one or more DFT size options (from FIG. 5 or FIG. 8) associated with the SCS option in the second column 1904.

The table 1900 of FIG. 19 may be used in the signal flow of FIG. 9. Indeed, the obtaining (step 902 or step 902A) of a plurality of options for a particular sub-band may involve a reference (to a local memory) to read a table of the sort represented as the table 1900 in FIG. 19. Accordingly, each UE 110 can be configured with one or more SCS options from the table 1900 of FIG. 19 with associated CP duration options and DFT size options. Of course, for CP duration options, Category 2 Type CP duration options can also be configured.

Note that, for a sub-band bandwidth X MHz, the number of resource blocks (or total resource elements) may be different for a different SCS option because the subcarrier spacing is different. For example, an X set to 30 MHz can be arranged as 100·30 kHz subcarriers or 200·15 kHz subcarriers.

A sub-band bandwidth X MHz can be also expressed as a number of resource blocks for a given SCS option. Consider an example wherein there are 20 resource blocks with 12 resource elements per resource block and the SCS option is set to $M_{scs_k}$. It follows that the sub-band bandwidth may be determined by evaluating the expression $20 \times 12 \times M_{scs_k}$. The sub-band bandwidth X (e.g., 20 resource blocks) is configurable and the configuration of the number of resource blocks on a sub-band can be accomplished, for example, in the control signaling that is transmitted (step 904, FIG. 9) from the base station 170 to the UE 110.

One of the benefits of establishing a greater number of DFT/FFT size options is a greater number of SCS options for a given sampling frequency or for a given set of sampling frequencies. It may be shown that establishing a greater number of DFT/FFT size options leads to more simplified CP designs (e.g., single CP duration) and reduced CP/more CP overhead options (e.g., as low as 6.7% instead of 25% for single CP duration options). Furthermore, support for transmissions with variable symbol durations may be established through selection (dynamically or semi-statically) of SCS options and DFT size options from a large set of SCS options and DFT size options in a BWP.

An increase, proposed herein, in the range of available DFT/FFT size options may be shown to provide, to a network entity, additional flexibility in that selection of DFT/FFT sizes may be based upon, e.g., channel bandwidth, transmission environment, UE processing capability, etc. Moreover, more DFT/FFT sizes provide more options for associated SCS options as well as more options on CP type and CP durations.

These can make possible a configuration wherein variable OFDM symbol durations may be transmitted within a single time unit. Furthermore, the transmissions may be made more spectrum efficient, for example, with reduced CP time lengths given a wider range of CP duration options.

The SCS options provided in the table 600 of FIG. 6 and the table 700 of FIG. 7 may be considered to support a wide variety options for OFDM symbol duration in data transmissions in a BWP (or sub-band). Helpfully, a plurality of OFDM symbols with different SCS options can be scheduled in a single transmission time unit or in a different transmission unit for a BWP (or sub-band). Such scheduling may be accomplished dynamically or semi-statically. An OFDM symbol duration can be chosen based on factors related to perceived demands of applications and/or channel transmission conditions. The factors may include factors related to power saving or efficiency, factors related to channel delay spread, factors related to Doppler situations, etc. Note that an OFDM symbol duration is equal to CP duration plus a useful OFDM signal duration.

For a channel BW in the relatively higher frequency ranges, multiple pairs of SCS/DFT options can be obtained in view of the inequality (2), which can be used for signal processing in data transmission and reception, thus providing flexible SCS or/and DFT (FFT) selection and usage in the channel BW for higher frequency ranges such as high end mmW bands and THz bands. Variable symbol durations in a single data transmission (or in a TTU) can be achieved, for example, by RRC configuration and/or dynamic scheduling via DCI.

When more DFT/FFT size options and SCS options are used, there may be further CP duration options, since CP duration options are associated with SCS options and DFT/FFT size options in addition to being associated with sampling frequency. More CP duration options provide more options for a combination of CP duration option and SCS duration option, especially when making one or more OFDM symbols align with a timing reference. Accordingly, more spectrum efficient data transmissions, expressed in terms of possible reduced CP overhead, can be achieved.

In one embodiment, for initial access procedure, UE may take predefined one or more SCSs and CP duration options to receive, e.g., DL synchronization (PSS and SSS), MIB, etc., where for signal processing, one or more (reference) sampling frequencies are pre-defined based on UE access carrier frequency bands or/and channel bandwidths.

In another embodiment, during initial access or after UE has entered into the network, UE may receive configuration(s) from a base station or transmission/receiving point on one or more SCS and CP duration options for one channel bandwidth, via a semi-static signaling or RRC signaling, for example, for frame structure configuration and/or bandwidth part configuration, in a way of cell common or UE dedicated signaling. Alternatively, during initial access or after UE has entered into the network, UE may receive configuration(s) from a base station or transmission/receiving point on one or more SCS and CP duration options for one channel bandwidth, via dynamic signaling such as DCI signaling, for example, during the scheduling process.

In other embodiments, during initial access or after UE has entered into the network, UE may receive configuration(s) from another UE on one or more SCS and CP duration options for one channel bandwidth, via a semi-static signaling or RRC signaling, for example, for frame structure configuration and/or bandwidth part configuration, in a way of cell common or UE dedicated signaling. Alternatively, during initial access or after UE has entered into the network, UE may receive configuration(s) from another UE on one or more SCS and CP duration options for one channel bandwidth, via dynamic signaling such as DCI signaling, for example, during the scheduling process.

UE configurations with a combination of semi-static/RRC signaling and dynamic/DCI signaling, same as described immediately above.

One or more sampling frequencies may be predefined for signal processing, each may be associated with a different application scenario, for example, one or more carrier frequency bands (or frequency ranges).

The frame duration and sub-frame duration, as timing references, each is pre-defined by one or more values where each value may be associated with a different application scenario, for example, one or more carrier frequency bands (or frequency ranges).

In one embodiment of aspects of the present application, there is provided a method performed by an apparatus, the method comprising obtaining a first set subcarrier spacing (SCS) options of at least one set SCS options for communicating signals, wherein each SCS option among the first set SCS options is an integer multiple of a first base SCS option from a plurality of base SCS options, wherein the at least one set SCS options comprises a second set SCS options, wherein each SCS option among the second set SCS options is an integer multiple of a second base SCS option from the plurality of base SCS options; and communicating signals using a first SCS option from any one of the first set SCS options and the second set SCS options in a carrier frequency band.

In this method, it may be that the first SCS option is an integer multiple of the first base SCS option; the second base SCS option is not an integer multiple of the first base SCS option; and the first base SCS option is not an integer multiple of the second base SCS option. It may be that all SCS options are associated with the carrier frequency band for an initial access to a network. The method may include receiving a control signaling, the control signaling indicating the first SCS option. It may be that the control signaling is Layer 1 signaling. The method may include transmitting a scheduling request, wherein the receiving the control signaling is responsive to the transmitting the scheduling request. It may be that the obtaining comprises accessing a predefined table. It may be that the control signaling further includes an indication of a plurality of cyclic prefix (CP) duration options, wherein each CP duration option among the plurality of CP duration options is associated with an SCS option among the SCS options. It may be that the control signaling comprises an indication of a subset of CP duration options among the plurality of CP duration options, wherein the subset of CP duration options is associated with the first SCS option. The method may further comprise maintaining a table, wherein the subset of CP duration options is associated with the first SCS option in the table. It may be that the control signaling further includes an indication of a Discrete Fourier Transform (DFT) size option associated with each SCS option among the SCS options. The method may further comprise transmitting a control signaling, the control signaling indicating the first SCS option. The method may further comprise selecting, on the basis of transmission demand, the first SCS option from any one of the first set SCS options and the second set SCS options. The method may further comprise selecting, on the basis of channel conditions, the first SCS option from any one of the first set SCS options and the second set SCS options.

In another embodiment of aspects of the present application, there is provided an apparatus comprising: a memory storing instructions; a processor caused, by execution of the instructions, to: obtain a first set subcarrier spacing (SCS) option among at least one set SCS option for communicating signals, wherein each SCS option among the first set SCS options is an integer multiple of a first base SCS option from a plurality of base SCS options, wherein the at least one set SCS options comprises second set SCS options, wherein each SCS option among the second set SCS options is an integer multiple of a second base SCS option from the plurality of base SCS options; and communicate signals using a first SCS option from any one of the first set SCS options and the second set SCS options in a carrier frequency band.

In a further embodiment of aspects of the present application, there is provided a computer-readable medium storing instructions, the instructions, when executed by a processor adapted for communicating using orthogonal frequency division multiplexing (OFDM), causing the processor to: obtain a first set subcarrier spacing (SCS) option among at least one set SCS option for communicating signals, wherein each SCS option among the first set SCS options is an integer multiple of a first base SCS option from a plurality of base SCS options, wherein the at least one set SCS options comprises second set SCS options, wherein each SCS option among the second set SCS options is an integer multiple of a second base SCS option from the plurality of base SCS options; and communicate signals using a first SCS option from any one of the first set SCS options and the second set SCS options in a carrier frequency band.

In a still further embodiment of aspects of the present application, there is provided a method performed by an apparatus, the method comprising: obtaining a plurality of sampling frequency options for communicating signal in a carrier frequency band; obtaining a first sampling frequency option from the plurality of sampling frequency options associated with a channel bandwidth in the carrier frequency band; and transmitting or receiving signal according to the first sampling frequency option for the channel bandwidth in the carrier frequency band. It may be that the carrier frequency band is a first carrier frequency band, the channel bandwidth is a first channel bandwidth, the plurality of sampling frequency options includes a second sampling frequency option associated with a second channel bandwidth in a second carrier frequency band, the second sampling frequency is different from the first sampling frequency and the first channel bandwidth is different from the second channel bandwidth. It may be that the first sampling frequency option is associated with a relatively lower frequency band and the method further comprises transmitting, for use for the communication session, an indication of a further sampling frequency option selected from the plurality of sampling frequency options, wherein the further sampling frequency option is associated with a relatively higher frequency band. It may be that the first sampling frequency option is associated with a relatively lower frequency band and the method further comprises: transmitting, for use for the communication session, an indication of the first further sampling frequency option selected from the plurality of sampling frequency options, wherein the first further sampling frequency option is associated with a relatively higher frequency band; and transmitting, for use for the communication session, an indication of a second further sampling frequency option selected from among the plurality of sampling frequency options, wherein the second further sampling frequency option is associated with the relatively higher frequency band. The method may further comprise selecting, on the basis of a selected subcarrier spacing option, the first sampling frequency option from the plurality of sampling frequency options. The method may further comprise selecting, on the basis of a selected Discrete Fourier Transform size option, the first sampling frequency option from the plurality of sampling frequency options. It may be that the first sampling frequency option is associated with a relatively lower frequency band and the method further comprises receiving, for use for the communication session, an indication of a further sampling frequency option selected from the plurality of sampling frequency options, wherein the further sampling frequency option is associated with a relatively higher frequency band. It may be that the first sampling frequency option is associated with a relatively lower frequency band and the method further comprises: receiving, for use for the communication session, an indication of the first further sampling frequency option selected from the plurality of sampling frequency options, wherein the first further sampling frequency option is associated with a relatively higher frequency band; and receiving, for use for the communication session, an indication of a second further sampling frequency option selected from among the plurality of sampling frequency options, wherein the second further sampling frequency option is associated with the relatively higher frequency band.

In an even still further embodiment of aspects of the present application, there is provided an apparatus comprising: a memory storing instructions; and a processor caused, by execution of the instructions, to: obtain a plurality of sampling frequency options for communicating signal in a carrier frequency band; obtain a first sampling frequency option from the plurality of sampling frequency options associated with a channel bandwidth in the carrier frequency band; and transmit or receive signal according to the first sampling frequency option for the channel bandwidth in the carrier frequency band.

In another embodiment of aspects of the present application, there is provided a computer-readable medium storing instructions, the instructions, when executed by a processor, causing the processor to: obtain a plurality of sampling frequency options for communicating signal in a carrier frequency band; obtain a first sampling frequency option from the plurality of sampling frequency options associated with a channel bandwidth in the carrier frequency band; and transmit or receive signal according to the first sampling frequency option for the channel bandwidth in the carrier frequency band.

In still another embodiment of aspects of the present application, there is provided a method performed by an apparatus, the method comprising: receiving control signaling from a network device, wherein the control signaling includes an indication of a plurality of subcarrier spacing (SCS) options for communicating signal within a sub-band of a channel; receiving a scheduling grant from the network device, the scheduling grant including an indication of a first SCS option from the plurality of SCS options; and communicating, in the sub-band of the channel, the signal according to the first SCS option.

This method may further comprise transmitting, to the network device, a scheduling request, wherein the receiving the scheduling grant is responsive to the transmitting the scheduling request. It may be that the control signaling further includes an indication of a plurality of cyclic prefix (CP) duration options, wherein each CP duration option among the plurality of CP duration options is associated with one or more SCS options from the plurality of SCS options. It may be that the scheduling grant comprises an indication of an active CP duration option among a subset of CP duration options, wherein the subset of CP duration options is associated with the first SCS option. The method may further comprise maintaining a table, wherein the subset of CP duration options is associated with the first SCS option in the table. It may be that the control signaling further includes an indication of a Discrete Fourier Transform (DFT) size option associated with each SCS option among the plurality of SCS options. It may be that the first SCS option is associated with the subset of CP duration options and the DFT size option by a table mapping. It may be that the control signaling further includes an indication of a default active SCS option among the plurality of SCS options, where the default active SCS option is to be used in the absence of further control signaling. It may be that the scheduling grant further includes an indication of a cyclic prefix (CP) duration option. It may be that the scheduling grant further includes an indication of a Discrete Fourier Transform (DFT) size option. It may be that the channel has a channel bandwidth and the sub-band has a sub-band bandwidth that is equal to or less than the channel bandwidth. It may be that the control signaling is carried by: radio resource control (RRC) signaling; a medium access control (MAC) control element (CE); or downlink control information (DCI). It may be that the control signaling comprises a reference frame duration. It may be that the scheduling grant comprises a reference frame duration. It may be that the control signaling comprises a reference sub-frame duration. It may be that the scheduling grant comprises a reference sub-frame duration.

In a further embodiment of aspects of the present application, there is provided a method performed by an apparatus, the method comprising: transmitting control signaling, wherein the control signaling includes an indication of a plurality of subcarrier spacing (SCS) options for communicating signal within a sub-band of a channel; transmitting a scheduling grant, the scheduling grant including an indication of a first SCS option from the plurality of SCS options; and communicating, in the sub-band of the channel, the signal according to the first SCS option.

This method may further comprise receiving a scheduling request, wherein the transmitting the scheduling grant is responsive to the receiving the scheduling request. It may be that the control signaling further includes an indication of a plurality of cyclic prefix (CP) duration options, wherein each CP duration option among the plurality of CP duration options is associated with one or more SCS options from the plurality of SCS options. It may be that the scheduling grant comprises an indication of an active CP duration option among a subset of CP duration options, wherein the subset of CP duration options is associated with the first SCS option. The method may further comprise maintaining a table, wherein the subset of CP duration options is associated with the first SCS option in the table. It may be that the control signaling further includes an indication of a Discrete Fourier Transform (DFT) size option associated with each SCS option among the plurality of SCS options. It may be that the first SCS option is associated with the subset of CP duration options and the DFT size option by a table mapping. It may be that the control signaling further includes an indication of a default active SCS option among the plurality of SCS options, where the default active SCS option is to be used in the absence of further control signaling. It may be that the scheduling grant further includes an indication of a cyclic prefix (CP) duration option. It may be that the scheduling grant further includes an indication of a Discrete Fourier Transform (DFT) size option. It may be that the channel has a channel bandwidth and the sub-band has a sub-band bandwidth that is equal to or less than the channel bandwidth. It may be that the control signaling is carried by: radio resource control (RRC) signaling; a medium access control (MAC) control element (CE); or downlink control information (DCI). It may be that the control signaling comprises a reference frame duration. It may be that the scheduling grant comprises a reference frame duration. It may be that the control signaling comprises a reference sub-frame duration. It may be that the scheduling grant comprises a reference sub-frame duration.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method performed by an apparatus, the method comprising:
    receiving a first configuration indicating a first subcarrier spacing (SCS) option from a first set of SCS options of at least one set of SCS options;
    wherein each SCS option among the first set of SCS options is an integer multiple of a first base SCS option from a plurality of base SCS options,
    wherein the at least one set of SCS options includes a second set of SCS options,
    wherein each SCS option among the second set of SCS options is an integer multiple of a second base SCS option from the plurality of base SCS options;
    wherein the first base SCS option is different from the second base SCS option;
    wherein the second base SCS option and the first base SCS option lack an integer multiple relationship; and
    communicating signals using the first SCS option in a carrier frequency band.

2. The method of claim 1, wherein the at least one set of SCS options is associated with the carrier frequency band for an initial access to a network.

3. The method of claim 1, further comprising obtaining the first set of SCS options or the second set of SCS options from a second configuration.

4. The method of claim 3, wherein any of the first configuration and the second configuration is Layer 1 signaling, radio resource control signaling, or a combination of Layer 1 signaling and radio resource control signaling.

5. The method of claim 3, wherein the second configuration further includes an indication of a plurality of cyclic prefix (CP) duration options, wherein each CP duration option among the plurality of CP duration options is associated with an SCS option among the set of SCS options and wherein the second configuration comprises an indication of a subset of CP duration options among the plurality of CP duration options, wherein the subset of CP duration options is associated with the first SCS option.

6. The method of claim 5, wherein the subset of CP duration options associating with the first SCS option is defined in a table.

7. The method of claim 1, further comprising receiving a further configuration indicating a discrete Fourier transform (DFT) size option associated with the first SCS option.

8. The method of claim 7, wherein the DFT size option is from a plurality of sets of DFT size options, where DFT sizes of any two DFT size options from different sets among the plurality of sets of DFT size options lack a multiple integer relationship.

9. The method of claim 7, wherein a predefined table defines SCS options and associated fast Fourier transform size options in the carrier frequency band.

10. The method of claim 1, wherein the carrier frequency band is a first carrier frequency band and the method further comprises communicating in a second carrier frequency band, where the first carrier frequency band is different from the second carrier frequency band.

11. The method of claim 10, wherein a first sampling frequency option used in the first carrier frequency band is distinct from a second sampling frequency used in the second carrier frequency band.

12. An apparatus comprising:
    at least one processor; and
    a non-transitory computer readable storage medium storing programming for execution by the at least one processor, the programming including instructions to:
        receive a first configuration indicating a first subcarrier spacing (SCS) option from a first set of SCS options of at least one set of SCS options;
        wherein each SCS option among the first set of SCS options is an integer multiple of a first base SCS option from a plurality of base SCS options,
        wherein the at least one set of SCS options includes a second set of SCS options,
        wherein each SCS option among the second set of SCS options is an integer multiple of a second base SCS option from the plurality of base SCS options;
        wherein the first base SCS option is different from the second base SCS option;
        the second base SCS option and the first base SCS option lack an integer multiple relationship; and
        communicate signals using the first SCS option in a carrier frequency band.

13. A method performed by a network node, the method comprising:
    transmitting a first configuration indicating a first subcarrier spacing (SCS) option from a first set of SCS options of at least one set of SCS options;
    wherein each SCS option among the first set of SCS options is an integer multiple of a first base SCS option from among a plurality of base SCS options, the at least one set of SCS options including a second set of SCS options,
    wherein each SCS option among the second set of SCS options is an integer multiple of a second base SCS option from among the plurality of base SCS options;

wherein the first base SCS option is different from the second base SCS option;

wherein the second base SCS option and the first base SCS option lack an integer multiple relationship; and communicating signals using the first SCS option in a carrier frequency band.

14. The method of claim 13, further comprising transmitting a second configuration indicating the first set of SCS options or the second set of SCS options.

15. The method of claim 14, wherein any of the first configuration and the second configuration is Layer 1 signaling, radio resource control signaling, or a combination of Layer 1 signaling and radio resource control signaling.

16. The method of claim 13, wherein the second configuration further includes an indication of a plurality of cyclic prefix (CP) duration options, wherein each CP duration option among the plurality of CP duration options is associated with an SCS option among the set of SCS options and wherein the second configuration comprises an indication of a subset of CP duration options among the plurality of CP duration options, wherein the subset of CP duration options is associated with the first SCS option.

17. The method of claim 16, further comprising maintaining a table, wherein the subset of CP duration options is associated with the first SCS option in the table.

18. The method of claim 13, further comprising transmitting a further configuration indicating a discrete Fourier transform (DFT) size option associated with the first SCS option.

19. An apparatus comprising:
at least one processor; and
a non-transitory computer readable storage medium storing programming for execution by the at least one processor, the programming including instructions to:
transmit a first subcarrier spacing (SCS) from a first set of SCS options of at least one set of SCS options;
wherein each SCS option among the first set of SCS options is an integer multiple of a first base SCS option from among a plurality of base SCS options, the at least one set of SCS options including a second set of SCS options,
wherein each SCS option among the second set of SCS options is an integer multiple of a second base SCS option from among the plurality of base SCS options;
wherein the first base SCS option is different from the second base SCS option;
wherein the second base SCS option and the first base SCS option lack an integer multiple relationship; and
communicating signals using the first SCS option in a carrier frequency band.

* * * * *